(12) United States Patent
Zeng et al.

(10) Patent No.: US 11,516,777 B2
(45) Date of Patent: Nov. 29, 2022

(54) DATA TRANSMISSION METHOD AND APPARATUS AND COMMUNICATIONS DEVICE

(71) Applicant: Huawei Technologies Co., Ltd., Shenzhen (CN)

(72) Inventors: Yongbo Zeng, Beijing (CN); Yu Cai, Beijing (CN); Jian Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 173 days.

(21) Appl. No.: 16/969,697

(22) PCT Filed: Feb. 1, 2019

(86) PCT No.: PCT/CN2019/074483
§ 371 (c)(1),
(2) Date: Aug. 13, 2020

(87) PCT Pub. No.: WO2019/157995
PCT Pub. Date: Aug. 22, 2019

(65) Prior Publication Data
US 2021/0014846 A1    Jan. 14, 2021

(30) Foreign Application Priority Data

Feb. 13, 2018  (CN) .......................... 201810150182.9

(51) Int. Cl.
*H04W 56/00* (2009.01)
*H04W 72/04* (2009.01)
*H04L 5/00* (2006.01)

(52) U.S. Cl.
CPC ....... *H04W 72/0406* (2013.01); *H04L 5/0005* (2013.01); *H04W 56/00* (2013.01)

(58) Field of Classification Search
CPC ....................................................... H04L 12/28
USPC ........................................................ 370/329
See application file for complete search history.

(56) References Cited

U.S. PATENT DOCUMENTS

| 11,075,786 | B1* | 7/2021 | Shattil .................. H04B 7/0456 |
| 2013/0039440 | A1 | 2/2013 | Lim et al. |
| 2014/0086184 | A1 | 3/2014 | Guan et al. |
| 2014/0123065 | A1* | 5/2014 | Bos .................... H04M 1/72445 715/816 |

(Continued)

FOREIGN PATENT DOCUMENTS

| CN | 101841892 A | 9/2010 |
| CN | 102271356 A | 12/2011 |
| CN | 102811495 A | 12/2012 |

(Continued)

OTHER PUBLICATIONS

Huawei, et al, "Discussion on carrier aggregation for R15 sidelink," 3GPP TSG RAN WG1 Meeting #88bis, R1-1704303, Spokane, USA, Apr. 3-7, 2017, 4 pages.

*Primary Examiner* — Dang T Ton
(74) *Attorney, Agent, or Firm* — Conley Rose, P.C.

(57) ABSTRACT

A data transmission method, an apparatus, and a communications device include sending, by a first device, first information using a first carrier, where the first information indicates that the first device uses N carriers in M carriers to send data, where N is an integer greater than or equal to 2, and N is less than or equal to M, sending, by the first device, the data using the N carriers.

20 Claims, 7 Drawing Sheets

(56) References Cited

U.S. PATENT DOCUMENTS

2014/0307676 A1  10/2014  Heo et al.

FOREIGN PATENT DOCUMENTS

| | | |
|---|---|---|
| CN | 103168441 A | 6/2013 |
| CN | 104869653 A | 8/2015 |
| CN | 105992378 A | 10/2016 |
| CN | 106788936 A | 5/2017 |
| EP | 2706807 A1 | 3/2014 |
| EP | 2757849 A1 | 7/2014 |
| EP | 3110195 A1 | 12/2016 |

* cited by examiner

Carrier #0  corresponds to the first bit of information #A

Carrier #1  corresponds to the second bit of information #A

Carrier #2  corresponds to the third bit of information #A

Carrier #3  corresponds to the fourth bit of information #A

Carrier #4  corresponds to the fifth bit of information #A

Carrier #5  corresponds to the sixth bit of information #A

Carrier #6  is used as a carrier #A

Carrier #7  corresponds to the seventh bit of information #A

☐ Time-frequency resource used when a device #A sends data

Information #A is: 1010001

FIG. 4

| Carrier #0 | [▦] | corresponds to the first bit of information #A |
| Carrier #1 | | is used as a carrier #A |
| Carrier #2 | [▦] | corresponds to the second bit of information #A |
| Carrier #3 | | corresponds to the third bit of information #A |
| Carrier #4 | | corresponds to the fourth bit of information #A |
| Carrier #5 | | corresponds to the fifth bit of information #A |
| Carrier #6 | | corresponds to the sixth bit of information #A |
| Carrier #7 | [▦] | corresponds to the seventh bit of information #A |

[▦] Time-frequency resource used when a device #A sends data

Information #A is: 1100001

FIG. 5

DATA TRANSMISSION METHOD AND APPARATUS AND COMMUNICATIONS DEVICE

CROSS-REFERENCE TO RELATED APPLICATIONS

This application is a U.S. National Stage of International Patent Application No. PCT/CN2019/074483 filed on Feb. 1, 2019, which claims priority to Chinese Patent Application No. 201810150182.9 filed on Feb. 13, 2018, both of which are hereby incorporated by reference in their entireties.

TECHNICAL HELD

This application relates to the communications field, and more specifically, to a data transmission method and apparatus and a communications device.

BACKGROUND

In a currently known communications technology, a sending device can use one carrier to send data to a receiving device, and can send scheduling information to the receiving device before sending the data. The scheduling information can indicate a time-frequency location that is of a time-frequency resource used by the sending device and that is on the carrier. In this way, the receiving device can determine the time-frequency resource based on the scheduling information, so that the receiving device does not need to perform blind detection on the carrier, thereby improving communication efficiency, and reducing processing load on the receiving device.

With the development of the communications technology, a quantity of carriers that are provided by a communications system and that can be used for wireless communication increases. If the sending device performs data transmission on some carriers provided by the communications system, based on an existing scheduling mechanism, the receiving device needs to determine whether there is scheduling information on each carrier; and then receives the data based on the scheduling information. Therefore, the receiving device needs to perform blind detection on each carrier to obtain the scheduling information, thereby reducing communication efficiency, and improving processing load on the receiving device.

SUMMARY

This application provides a data transmission method and apparatus, which can improve communication efficiency, and reduce processing load on a receiving device.

According to a first aspect, a data transmission method is provided. The method includes: sending, by a first device, first information by using a first carrier, where the first information is used to indicate that the first device uses N carriers in M carriers to send data, where N is an integer greater than or equal to 2, and N is less than or equal to M; and sending, by the first device, the data by using the N carriers.

Based on the data transmission method in this application, a sending device sends first information on one carrier, where the first information is used to indicate a plurality of carriers used when the sending device sends data. In this way, a receiving device does not need to perform blind detection on each carrier, and can determine, based on the first information, whether each carrier is used by the sending device, thereby improving communication efficiency, and reducing processing load on the receiving device.

With reference to the first aspect, in a possible implementation, the M carriers are carriers supported by a communications system in which the first device is located, and M is an integer greater than or equal to 2.

It should be noted that the first device can support (or in other words, can use) all of the M carriers.

Alternatively, the first device can also support some of the M carriers.

Moreover, the N carriers may be all of carriers that can be supported by the first device and that are in the M carriers.

Alternatively, the N carriers may also be some of carriers that can be supported by the first device and that are in the M carriers.

With reference to the first aspect and any one of the foregoing possible implementations, in a second possible implementation, the first information is specifically used to indicate whether each carrier other than the first carrier in the M carriers includes a first time-frequency resource, where the first time-frequency resource is a time-frequency resource used when the first device sends the data.

With reference to the second possible implementation of the first aspect, in a third possible implementation, the first information includes M-1 bits, the M-1 bits are in a one-to-one correspondence to M-1 carriers, and each bit is used to indicate whether a corresponding carrier includes the first time-frequency resource, where the M-1 carriers are carriers other than the first carrier in the M carriers.

By pre-specifying whether the first carrier is used to transmit data, there is no need to additionally transmit an indication whether the first carrier is used to transmit data, thereby reducing resource overheads for transmitting the first information.

With reference to the third possible implementation of the first aspect, in a fourth possible implementation, M is 8, and the first information includes seven bits.

In the communications system such as an Internet of Vehicles, a quantity of carriers that can be used is 8, and for example, a quantity of reserved bits in sidelink control information SCI in the communications system is 7. Therefore, the foregoing implementation can be effectively applied to the Internet of Vehicles system, thereby further improving compatibility and practicality of this application.

With reference to the first aspect and any one of the foregoing possible implementations, in a fifth possible implementation, the first information is further used to indicate that a carrier that carries the first information is the carrier used when the sending device sends the data; or the first information is further used to indicate that a carrier that carries the first information is not the carrier used when the sending device sends the data.

In this way, the first information can indicate whether the first carrier is used for data transmission, so that a receive end can correctly receive information.

With reference to the first aspect, in a sixth possible implementation, the first information is specifically used to indicate whether each of the M carriers includes a first time-frequency resource, where the first time-frequency resource is the time-frequency resource used when the first device sends the data.

With reference to the sixth possible implementation of the first aspect, in a seventh possible implementation, the first information includes M bits, the M bits are in a one-to-one correspondence to M carriers, and each bit is used to indicate whether the corresponding carrier includes the first time-frequency resource.

With reference to the first aspect and any one of the foregoing possible implementations, in an eighth possible implementation, the first carrier is a carrier specified by the communications system, or the first carrier is a preconfigured carrier, or the first carrier is a carrier configured by a network device, or the first carrier is a primary component carrier in the M carriers, or the first carrier carries a first identifier sent by the first device, where the first identifier is used to indicate that the carrier that carries the first identifier carries the first information.

It should be noted that a plurality of devices including the first device can use the first carrier to send cross-carrier scheduling information. In this case, the first carrier can carry the first identifier sent by the plurality of devices.

Alternatively, the first carrier can only be used by the first device to send the first information. In this case, the first carrier can carry only the first identifier sent by the first device.

With reference to the first aspect and any one of the foregoing possible implementations, in a ninth possible implementation, the sending, by a first device, first information by using a first carrier includes: sending, by the first device, the first identifier and the first information by using the first carrier, where the first identifier is used to indicate that the carrier that carries the first identifier carries the first information.

With reference to the ninth possible implementation of the first aspect, in a tenth possible implementation, the first identifier is carried in a resource reservation field in the sidelink control information SCI; or, optionally, the first identifier is carried in a modulation and coding scheme MCS field in the SCI.

In this way, the receiving device can determine the carrier in the M carriers that carries the first identifier as the carrier used to carry the first information.

With reference to the first aspect and any one of the foregoing possible implementations, in an eleventh possible implementation, the first carrier carries a synchronization signal, and a carrier other than the first carrier in the M carriers does not carry the synchronization signal.

With reference to the eleventh possible implementation of the first aspect, in a twelfth possible implementation, the sending, by a first device, first information by using a first carrier includes: sending, by the first device, the first identifier and the synchronization signal by using the first carrier, and skipping sending the synchronization signal on a carrier other than the first carrier in the M carriers.

In this way, the receiving device can determine the carrier in the M carriers that carries the synchronization signal as the carrier used to carry the first information.

With reference to the first aspect and any one of the foregoing possible implementations, in a thirteenth possible implementation, a synchronization signal carried in the first carrier corresponds to a specified first sequence, where the first sequence is used to indicate that the carrier that carries the synchronization signal corresponding to the first sequence carries the first information.

With reference to the thirteenth possible implementation of the first aspect, in a fourteenth possible implementation, the first sequence includes a primary sidelink synchronization signal sequence or a secondary sidelink synchronization signal sequence.

In this way, based on the foregoing solutions, the receiving device can easily determine a carrier that carries the first information, so that the receiving device does not need to perform blind detection on each carrier to obtain the first information, thereby improving communication efficiency, and reducing processing load on the receiving device.

With reference to the first aspect and any one of the foregoing possible implementations, in a fifteenth possible implementation, a location of the first time-frequency resource on the N carriers is preconfigured, where the first time-frequency resource is the time-frequency resource used when the first device sends the data.

With reference to the first aspect and any one of the foregoing possible implementations, in a sixteenth possible implementation, a location of the first time-frequency resource on the N carriers is determined based on information of the first device, where the first time-frequency resource is the time-frequency resource used when the first device sends the data.

With reference to the first aspect and any one of the foregoing possible implementations, in a seventeenth possible implementation, locations of the first time-frequency resources on the N carriers are the same.

With reference to the first aspect and any one of the foregoing possible implementations, in an eighteenth possible implementation, the method further includes: sending, by the first device, second information by using the first carrier, where the second information is used to indicate a location of the first time-frequency resource on the first carrier, and the first time-frequency resource is the time-frequency resource used when the first device sends the data, where the location of the first time-frequency resource on the N carriers is the same as the location of the first time-frequency resource on the first carrier.

"A location of a time-frequency resource" may refer to a time domain location of the time-frequency resource.

Alternatively, "a location of a time-frequency resource" may refer to a frequency domain location of the time-frequency resource.

With reference to the eighteenth implementation of the first aspect, in a nineteenth possible implementation, the second information is specifically used to indicate an offset of the location of the first time-frequency resource that is relative to a reference location.

With reference to the first aspect and any one of the foregoing possible implementations, in a twentieth possible implementation, the method further includes: sending, by the first device, N pieces of third information by using the first carrier, or sending, by the first device, N pieces of third indication information by using the N carriers, where the N carriers are in a one-to-one correspondence to the N pieces of third indication information, and each piece of third information is used to indicate the location of the first time-frequency resource on a corresponding carrier, where the first time-frequency resource is the time-frequency resource used when the first device sends the data.

With reference to the twentieth implementation of the first aspect, in a twenty-first possible implementation, each piece of third information is specifically used to indicate an offset of the location of the first time-frequency resource on the corresponding carrier that is relative to the reference location.

With reference to the twenty-first implementation of the first aspect, in a twenty-second possible implementation, the reference location is a location specified by the communications system.

With reference to the twenty-first implementation of the first aspect, in a twenty-third possible implementation, the reference location is a preconfigured location.

With reference to the twenty-first implementation of the first aspect, in a twenty-fourth possible implementation, the reference location is a location configured by the network device.

With reference to the twenty-first implementation of the first aspect, in a twenty-fifth possible implementation, the reference location is the location of the first time-frequency resource on a second carrier in the N carriers.

With reference to the twenty-fifth implementation of the first aspect, in a twenty-sixth possible implementation, the second carrier is a carrier specified by the communications system.

With reference to the twenty-fifth implementation of the first aspect, in a twenty-seventh possible implementation, the second carrier is a preconfigured carrier.

With reference to the twenty-fifth implementation of the first aspect, in a twenty-eighth possible implementation, the second carrier is a carrier configured by the network device.

With reference to the twenty-fifth implementation of the first aspect, in a twenty-ninth possible implementation, the second carrier is a primary component carrier in the N carriers.

With reference to the twenty-fifth implementation of the first aspect, in a thirtieth possible implementation, the second carrier carries a synchronization signal, and a carrier other than the second carrier in the N carriers does not carry the synchronization signal, where a location of a first time-frequency resource on the carrier that carries the synchronization signal is the reference location.

With reference to the twenty-fifth implementation of the first aspect, in a thirty-first possible implementation, a synchronization signal carried in the second carrier corresponds to a specified second sequence, where the second sequence is used to indicate that a location of a first time-frequency resource on the carrier that carries the synchronization signal corresponding to the second sequence is a reference time domain location.

With reference to the first aspect and any one of the foregoing possible implementations, in a thirty-second possible implementation, the N pieces of third information are carried in sidelink control information SCI.

With reference to the first aspect and any one of the foregoing possible implementations, in a thirty-third possible implementation, each piece of third information is carried in a media access control MAC control element CE of a data packet carried by the corresponding carrier.

With reference to the first aspect and any one of the foregoing possible implementations, in a thirty-fourth possible implementation, the first information is carried in sidelink control information SCI.

With reference to the first aspect and any one of the foregoing possible implementations, in a thirty-fifth possible implementation, the second information is carried in a media access control MAC control element CE.

With reference to the first aspect and any one of the foregoing possible implementations, in a thirty-sixth possible implementation, the first device is a terminal device.

With reference to the first aspect and any one of the foregoing possible implementations, in a thirty-seventh possible implementation, the first device is a network device.

With reference to the first aspect and any one of the foregoing possible implementations, in a thirty-eighth possible implementation, the communications system is an Internet of Vehicles system.

According to a second aspect, a data transmission method is provided, including: receiving, by a second device, first information from a first device by using a first carrier, where the first information is used to indicate that the first device uses N carriers in M carriers to send data, where N is an integer greater than or equal to 2, and N is less than or equal to M; and receiving, by the second device, the data from the first device by using one or more carriers in the N carriers.

Based on the data transmission method in this application, a sending device sends first information on one carrier, where the first information is used to indicate a plurality of carriers used when the sending device sends data. In this way, a receiving device does not need to perform blind detection on each carrier, and can determine, based on the first information, whether each carrier is used by the sending device, thereby improving communication efficiency, and reducing processing load on the receiving device.

With reference to the second aspect, in a possible implementation, the M carriers are carriers supported by a communications system in which the first device is located, and M is an integer greater than or equal to 2.

It should be noted that the first device can support (or in other words, can use) all of the M carriers.

Alternatively, the first device can also support some of the M carriers.

Moreover, the N carriers may be all of carriers that can be supported by the first device and that are in the M carriers.

Alternatively, the N carriers may also be some of carriers that can be supported by the first device and that are in the M carriers.

With reference to the second aspect and any one of the foregoing possible implementations, in a second possible implementation, the first information is specifically used to indicate whether each carrier other than the first carrier in the M carriers includes a first time-frequency resource, where the first time-frequency resource is a time-frequency resource used when the first device sends the data.

With reference to the second implementation of the second aspect, in a third possible implementation, the first information includes M-1 bits, the M-1 bits are in a one-to-one correspondence to M-1 carriers, and each bit is used to indicate whether a corresponding carrier includes the first time-frequency resource, where the M-1 carriers are carriers other than the first carrier in the M carriers.

In this way, resource overheads for transmitting the first information can be reduced.

Optionally, M is 8, and the first information includes seven bits.

With reference to the second aspect and any one of the foregoing possible implementations, in a fourth possible implementation, the first information is further used to indicate that a carrier that carries the first information is the carrier used when the sending device sends the data; or the first information is further used to indicate that a carrier that carries the first information is not a carrier used when the sending device sends the data.

With reference to the second aspect, in a fifth possible implementation, the first information is specifically used to indicate whether each of the M carriers includes a first time-frequency resource, where the first time-frequency resource is a time-frequency resource used when the first device sends the data.

With reference to the fifth implementation of the second aspect, in a sixth possible implementation, the first information includes M bits, the M bits are in a one-to-one correspondence to M carriers, and each bit is used to indicate whether the corresponding carrier includes the first time-frequency resource.

With reference to the second aspect and any one of the foregoing possible implementations, in a seventh possible implementation, the first carrier is a carrier specified by the communications system, or the first carrier is a preconfigured carrier, or the first carrier is a carrier configured by a network device, or the first carrier is a primary component carrier in the M carriers.

With reference to the second aspect and any one of the foregoing possible implementations, in an eighth possible implementation, the first carrier carries a first identifier sent by the first device, where the first identifier is used to indicate that the carrier that carries the first identifier carries the first information.

In this case, the method further includes: determining, by the second device, a carrier in the M carriers that carries the first identifier sent by the first device as the first carrier.

With reference to the eighth implementation of the second aspect, in a ninth possible implementation, the first identifier is preconfigured, or the first identifier is configured by a network device.

It should be noted that a plurality of devices including the first device can use the first carrier to send cross-carrier scheduling information. In this case, the first carrier can carry the first identifier sent by the plurality of devices.

Alternatively, the first carrier can only be used by the first device to send the first information. In this case, the first carrier can carry only the first identifier sent by the first device.

With reference to the second aspect and any one of the foregoing possible implementations, in a tenth possible implementation, the first identifier is carried in a resource reservation field of sidelink control information SCI.

With reference to the second aspect and any one of the foregoing possible implementations, in an eleventh possible implementation, the first identifier is carried in a modulation and coding scheme MCS field in the SCI.

In this way, the receiving device can determine the carrier in the M carriers that carries the first identifier as the carrier used to carry the first information.

With reference to the second aspect and any one of the foregoing possible implementations, in a twelfth possible implementation, the first carrier carries a synchronization signal, and a carrier other than the first carrier in the M carriers does not carry the synchronization signal.

With reference to the second aspect and any one of the foregoing possible implementations, in a thirteenth possible implementation, the method further includes: determining, by the second device, a carrier in the M carriers that carries the synchronization signal as the first carrier.

In other words, the first device sends the synchronization signal only on the first carrier, that is, does not carry the synchronization signal in a carrier other than the first carrier.

In this way, the receiving device can determine the carrier in the M carriers that carries the synchronization signal as the carrier used to carry the first information.

With reference to the second aspect and any one of the foregoing possible implementations, in a fourteenth possible implementation, a synchronization signal carried in the first carrier corresponds to a specified first sequence, where the first sequence is used to indicate that the carrier that carries the synchronization signal corresponding to the first sequence carries the first information.

In this case, the method further includes: determining, by the second device, a carrier in the M carriers that carries the synchronization signal corresponding to the first sequence as the first carrier.

With reference to the second aspect and any one of the foregoing possible implementations, in a fifteenth possible implementation, the first sequence includes a primary sidelink synchronization signal sequence or a secondary sidelink synchronization signal sequence.

In this way, based on the foregoing solutions, the receiving device can easily determine a carrier that carries the first information, so that the receiving device does not need to perform blind detection on each carrier to obtain the first information, thereby improving communication efficiency, and reducing processing load on the receiving device.

With reference to the second aspect and any one of the foregoing possible implementations, in a sixteenth possible implementation, a location of the first time-frequency resource on the N carriers is specified by the communications system, where the first time-frequency resource is the time-frequency resource used when the first device sends the data.

With reference to the second aspect and any one of the foregoing possible implementations, in a seventeenth possible implementation, a location of the first time-frequency resource on the N carriers is determined based on information of the first device, where the first time-frequency resource is the time-frequency resource used when the first device sends the data.

With reference to the second aspect and any one of the foregoing possible implementations, in an eighteenth possible implementation, locations of the first time-frequency resources on the N carriers are the same.

With reference to the second aspect and any one of the foregoing possible implementations, in a nineteenth possible implementation, the method further includes: receiving, by the second device, second information from the first device by using the first carrier, where the second information is used to indicate a location of the first time-frequency resource on the first carrier, and the first time-frequency resource is the time-frequency resource used when the first device sends the data, where the location of the first time-frequency resource on the N carriers is the same as a time domain location of the first time-frequency resource on the first carrier.

With reference to the nineteenth implementation of the second aspect, in a twentieth possible implementation, the second information is specifically used to indicate an offset of the location of the first time-frequency resource that is relative to a reference location.

With reference to the second aspect and any one of the foregoing possible implementations, in a twenty-first possible implementation, the method further includes: receiving, by the second device, N pieces of third information from the first device by using the first carrier; or receiving, by the second device, one or more pieces of third indication information in the N carriers from the first device by using one or more carriers in the N carriers, where the N carriers are in a one-to-one correspondence to the N pieces of third indication information, and each piece of third information is used to indicate the location of the first time-frequency resource on a corresponding carrier, where the first time-frequency resource is the time-frequency resource used when the first device sends the data.

With reference to the twenty-first implementation of the second aspect, in a twenty-second possible implementation, each piece of third information is specifically used to indicate an offset of the location of the first time-frequency resource on the corresponding carrier that is relative to the reference location.

With reference to the twenty-second implementation of the second aspect, in a twenty-third possible implementation, the reference location is a time domain location specified by the communications system.

With reference to the twenty-second implementation of the second aspect, in a twenty-fourth possible implementation, the reference location is the location of the first time-frequency resource on a second carrier in the N carriers, where the second carrier is a carrier specified by the communications system.

With reference to the twenty-fourth implementation of the second aspect, in a twenty-fifth possible implementation, the second carrier is a primary component carrier in the N carriers.

With reference to the twenty-fourth implementation of the second aspect, in a twenty-sixth possible implementation, the second carrier carries a synchronization signal, and a carrier other than the second carrier in the N carriers does not carry the synchronization signal, where a location of a first time-frequency resource on the carrier that carries the synchronization signal is a reference time domain location.

With reference to the twenty-fourth implementation of the second aspect, in a twenty-seventh possible implementation, a synchronization signal carried in the second carrier corresponds to a specified second sequence, where the second sequence is used to indicate that a location of a first time-frequency resource on the carrier that carries the synchronization signal corresponding to the second sequence is a reference time domain location.

With reference to the twenty-first implementation of the second aspect, in a twenty-eighth possible implementation, the N pieces of third information are carried in sidelink control information SCI.

With reference to the twenty-first implementation of the second aspect, in a twenty-ninth possible implementation, each piece of third information is carried in a media access control MAC control element CE of a data packet carried by the corresponding carrier.

With reference to the second aspect and any one of the foregoing possible implementations, in a thirtieth possible implementation, the first information is carried in sidelink control information SCI; or the first information is carried in a media access control MAC control element CE.

With reference to the second aspect and any one of the foregoing possible implementations, in a thirty-first possible implementation, the second information is carried in sidelink control information SCI; or the second information is carried in a media access control MAC control element CE.

With reference to the second aspect and any one of the foregoing possible implementations, in a thirty-second possible implementation, the first device is a terminal device or a network device, and the second device is a terminal device or a network device.

With reference to the second aspect and any one of the foregoing possible implementations, in a thirty-third possible implementation, the communications system is an Internet of Vehicles system.

According to a third aspect, a communications device is provided, including: a transceiver, configured to receive or send data or information; and a processor, configured to: control the transceiver to send first information by using a first carrier, where the first information is used to indicate that the communications device uses N carriers in M carriers to send data, where N is an integer greater than or equal to 2, and N is less than or equal to M; and control the transceiver to send the data by using the N carriers.

Based on the communications device in this application, a sending device sends first information on one carrier, where the first information is used to indicate a plurality of carriers used when the sending device sends data. In this way, a receiving device does not need to perform blind detection on each carrier, and can determine, based on the first information, whether each carrier is used by the sending device, thereby improving communication efficiency, and reducing processing load on the receiving device.

With reference to the third aspect, in a possible implementation, the M carriers are carriers supported by a communications system in which the communications device is located, and M is an integer greater than or equal to 2.

It should be noted that the communications device can support (or in other words, can use) all of the M carriers.

Alternatively, the communications device can also support some of the M carriers.

Moreover, the N carriers may be all of carriers that can be supported by the communications device and that are in the M carriers.

Alternatively, the N carriers may also be some of carriers that can be supported by the communications device and that are in the M carriers.

With reference to the third aspect and any one of the foregoing possible implementations, in a second possible implementation, the first information is specifically used to indicate whether each carrier other than the first carrier in the M carriers includes a first time-frequency resource, where the first time-frequency resource is the time-frequency resource used when the communications device sends the data.

With reference to the second possible implementation of the third aspect, in a third possible implementation, the first information includes M-1 bits, the M-1 bits are in a one-to-one correspondence to M-1 carriers, and each bit is used to indicate whether a corresponding carrier includes the first time-frequency resource, where the M-1 carriers are carriers other than the first carrier in the M carriers.

By pre-specifying whether the first carrier is used to transmit data, there is no need to additionally transmit an indication whether the first carrier is used to transmit data, thereby reducing resource overheads for transmitting the first information.

With reference to the third possible implementation of the third aspect, in a fourth possible implementation, M is 8, and the first information includes seven bits.

In the communications system such as an Internet of Vehicles, a quantity of carriers that can be used is 8, and for example, a quantity of reserved bits in sidelink control information SCI in the communications system is 7. Therefore, the foregoing implementation can be effectively applied to the Internet of Vehicles system, thereby further improving compatibility and practicality of this application.

With reference to the third aspect and any one of the foregoing possible implementations, in a fifth possible implementation, the first information is further used to indicate that a carrier that carries the first information is the carrier used when the sending device sends the data; or the first information is further used to indicate that a carrier that carries the first information is not the carrier used when the sending device sends the data.

In this way, the first information can indicate whether the first carrier is used for data transmission, thereby reducing processing load of blind detection performed by a receive end.

With reference to the third aspect, in a sixth possible implementation, the first information is specifically used to indicate whether each of the M carriers includes a first time-frequency resource, where the first time-frequency resource is the time-frequency resource used when the communications device sends the data.

With reference to the sixth possible implementation of the third aspect, in a seventh possible implementation, the first information includes M bits, the M bits are in a one-to-one correspondence to M carriers, and each bit is used to indicate whether the corresponding carrier includes the first time-frequency resource.

With reference to the third aspect and any one of the foregoing possible implementations, in an eighth possible implementation, the first carrier is a carrier specified by the communications system, or the first carrier is a preconfigured carrier, or the first carrier is a carrier configured by a network device, or the first carrier is a primary component carrier in the M carriers, or the first carrier carries a first identifier sent by the communications device, where the first identifier is used to indicate that the carrier that carries the first identifier carries the first information.

It should be noted that a plurality of devices including the communications device can use the first carrier to send cross-carrier scheduling information. In this case, the first carrier can carry the first identifier sent by the plurality of devices.

Alternatively, the first carrier can only be used by the communications device to send the first information. In this case, the first carrier can carry only the first identifier sent by the communications device.

With reference to the third aspect and any one of the foregoing possible implementations, in a ninth possible implementation, the sending, by a communications device, first information by using a first carrier includes: sending, by the communications device, the first identifier and the first information by using the first carrier, where the first identifier is used to indicate that the carrier that carries the first identifier carries the first information.

With reference to the ninth possible implementation of the third aspect, in a tenth possible implementation, the first identifier is carried in a resource reservation field in the sidelink control information SCI; or, optionally, the first identifier is carried in a modulation and coding scheme MCS field in the SCI.

In this way, the receiving device can determine the carrier in the M carriers that carries the first identifier as the carrier used to carry the first information.

With reference to the third aspect and any one of the foregoing possible implementations, in an eleventh possible implementation, the first carrier carries a synchronization signal, and a carrier other than the first carrier in the M carriers does not carry the synchronization signal.

With reference to the eleventh possible implementation of the third aspect, in a twelfth possible implementation, the sending, by a communications device, first information by using a first carrier includes: sending, by the communications device, the first identifier and the synchronization signal by using the first carrier, and skipping sending the synchronization signal on a carrier other than the first carrier in the M carriers.

In this way, the receiving device can determine the carrier in the M carriers that carries the synchronization signal as the carrier used to carry the first information.

With reference to the third aspect and any one of the foregoing possible implementations, in a thirteenth possible implementation, a synchronization signal carried in the first carrier corresponds to a specified first sequence, where the first sequence is used to indicate that the carrier that carries the synchronization signal corresponding to the first sequence carries the first information.

With reference to the thirteenth possible implementation of the first aspect, in a fourteenth possible implementation, the first sequence includes a primary sidelink synchronization signal sequence or a secondary sidelink synchronization signal sequence.

In this way, based on the foregoing solutions, the receiving device can easily determine a carrier that carries the first information, so that the receiving device does not need to perform blind detection on each carrier to obtain the first information, thereby improving communication efficiency, and reducing processing load on the receiving device.

With reference to the third aspect and any one of the foregoing possible implementations, in a fifteenth possible implementation, a location of the first time-frequency resource on the N carriers is preconfigured, where the first time-frequency resource is the time-frequency resource used when the communications device sends the data.

With reference to the third aspect and any one of the foregoing possible implementations, in a sixteenth possible implementation, a location of the first time-frequency resource on the N carriers is determined based on information of the communications device, where the first time-frequency resource is the time-frequency resource used when the communications device sends the data.

With reference to the third aspect and any one of the foregoing possible implementations, in a seventeenth possible implementation, locations of the first time-frequency resources on the N carriers are the same.

With reference to the third aspect and any one of the foregoing possible implementations, in an eighteenth possible implementation, the processor is further configured to control the transceiver to send second information by using the first carrier, where the second information is used to indicate a location of the first time-frequency resource on the first carrier, and the first time-frequency resource is the time-frequency resource used when the communications device sends the data, where the location of the first time-frequency resource on the N carriers is the same as the location of the first time-frequency resource on the first carrier.

"A location of a time-frequency resource" may refer to a time domain location of the time-frequency resource.

Alternatively, "a location of a time-frequency resource" may refer to a frequency domain location of the time-frequency resource.

With reference to the eighteenth implementation of the third aspect, in a nineteenth possible implementation, the second information is specifically used to indicate an offset of the location of the first time-frequency resource that is relative to a reference location.

With reference to the third aspect and any one of the foregoing possible implementations, in a twentieth possible implementation, the processor is further configured to: control the transceiver to send N pieces of third information by using the first carrier; or control the communications device to send N pieces of third indication information by using the N carriers, where the N carriers are in a one-to-one correspondence to the N pieces of third indication information, and each piece of third information is used to indicate the location of the first time-frequency resource on a corresponding carrier, where the first time-frequency resource is the time-frequency resource used when the communications device sends the data.

With reference to the twentieth implementation of the third aspect, in a twenty-first possible implementation, each piece of third information is specifically used to indicate an offset of the location of the first time-frequency resource on the corresponding carrier that is relative to the reference location.

With reference to the twenty-first implementation of the third aspect, in a twenty-second possible implementation, the reference location is a location specified by the communications system.

With reference to the twenty-first implementation of the third aspect, in a twenty-third possible implementation, the reference location is a preconfigured location.

With reference to the twenty-first implementation of the third aspect, in a twenty-fourth possible implementation, the reference location is a location configured by the network device.

With reference to the twenty-first implementation of the third aspect, in a twenty-fifth possible implementation, the reference location is the location of the first time-frequency resource on a second carrier in the N carriers.

With reference to the twenty-fifth implementation of the third aspect, in a twenty-sixth possible implementation, the second carrier is a carrier specified by the communications system.

With reference to the twenty-fifth implementation of the third aspect, in a twenty-seventh possible implementation, the second carrier is a preconfigured carrier.

With reference to the twenty-fifth implementation of the third aspect, in a twenty-eighth possible implementation, the second carrier is a carrier configured by the network device.

With reference to the twenty-fifth implementation of the third aspect, in a twenty-ninth possible implementation, the second carrier is a primary component carrier in the N carriers.

With reference to the twenty-fifth implementation of the third aspect, in a thirtieth possible implementation, the second carrier carries a synchronization signal, and a carrier other than the second carrier in the N carriers does not carry the synchronization signal, where a location of a first time-frequency resource on the carrier that carries the synchronization signal is the reference location.

With reference to the twenty-fifth implementation of the third aspect, in a thirty-first possible implementation, a synchronization signal carried in the second carrier corresponds to a specified second sequence, where the second sequence is used to indicate that a location of a first time-frequency resource on the carrier that carries the synchronization signal corresponding to the second sequence is a reference time domain location.

With reference to the third aspect and any one of the foregoing possible implementations, in a thirty-second possible implementation, the N pieces of third information are carried in sidelink control information SCI.

With reference to the third aspect and any one of the foregoing possible implementations, in a thirty-third possible implementation, each piece of third information is carried in a media access control MAC control element CE of a data packet carried by the corresponding carrier.

With reference to the third aspect and any one of the foregoing possible implementations, in a thirty-fourth possible implementation, the first information is carried in sidelink control information SCI.

With reference to the third aspect and any one of the foregoing possible implementations, in a thirty-fifth possible implementation, the second information is carried in a media access control MAC control element CE.

With reference to the third aspect and any one of the foregoing possible implementations, in a thirty-sixth possible implementation, the communications device is a terminal device.

With reference to the third aspect and any one of the foregoing possible implementations, in a thirty-seventh possible implementation, the communications device is a network device.

With reference to the third aspect and any one of the foregoing possible implementations, in a thirty-eighth possible implementation, the communications system is an Internet of Vehicles system.

According to a fourth aspect, a communications device is provided, including: a transceiver, configured to: receive or send data or information; and a processor, configured to control the transceiver to receive first information from a first device by using a first carrier, where the first information is used to indicate that the first device uses N carriers in M carriers to send data, where N is an integer greater than or equal to 2, and N is less than or equal to M; and control the transceiver to receive the data from the first device by using one or more carriers in the N carriers.

Based on the communications device in this application, a sending device sends first information on one carrier, where the first information is used to indicate a plurality of carriers used when the sending device sends data. In this way, a receiving device does not need to perform blind detection on each carrier, and can determine, based on the first information, whether each carrier is used by the sending device, thereby improving communication efficiency, and reducing processing load on the receiving device.

With reference to the fourth aspect, in a possible implementation, the M carriers are carriers supported by a communications system in which the first device is located, and M is an integer greater than or equal to 2.

It should be noted that the first device can support (or in other words, can use) all of the M carriers.

Alternatively, the first device can also support some of the M carriers.

Moreover, the N carriers may be all of carriers that can be supported by the first device and that are in the M carriers.

Alternatively, the N carriers may also be some of carriers that can be supported by the first device and that are in the M carriers.

With reference to the fourth aspect and any one of the foregoing possible implementations, in a second possible implementation, the first information is specifically used to indicate whether each carrier other than the first carrier in the M carriers includes a first time-frequency resource, where the first time-frequency resource is a time-frequency resource used when the first device sends the data.

With reference to the second implementation of the fourth aspect, in a third possible implementation, the first information includes M-1 bits, the M-1 bits are in a one-to-one correspondence to M-1 carriers, and each bit is used to indicate whether a corresponding carrier includes the first time-frequency resource, where the M-1 carriers are carriers other than the first carrier in the M carriers.

In this way, resource overheads for transmitting the first information can be reduced.

Optionally, M is 8, and the first information includes seven bits.

With reference to the fourth aspect and any one of the foregoing possible implementations, in a fourth possible implementation, the first information is further used to indicate that a carrier that carries the first information is the carrier used when the sending device sends the data; or the first information is further used to indicate that a carrier that carries the first information is not a carrier used when the sending device sends the data.

With reference to the fourth aspect, in a fifth possible implementation, the first information is specifically used to indicate whether each of the M carriers includes a first time-frequency resource, where the first time-frequency resource is the time-frequency resource used when the first device sends the data.

With reference to the fifth implementation of the fourth aspect, in a sixth possible implementation, the first information includes M bits, the M bits are in a one-to-one correspondence to M carriers, and each bit is used to indicate whether the corresponding carrier includes the first time-frequency resource.

With reference to the fourth aspect and any one of the foregoing possible implementations, in a seventh possible implementation, the first carrier is a carrier specified by the communications system, or the first carrier is a preconfigured carrier, or the first carrier is a carrier configured by a network device, or the first carrier is a primary component carrier in the M carriers.

With reference to the fourth aspect and any one of the foregoing possible implementations, in an eighth possible implementation, the first carrier carries a first identifier sent by the first device, where the first identifier is used to indicate that the carrier that carries the first identifier carries the first information.

In this case, the processor is further configured to determine a carrier in the M carriers that carries the first identifier sent by the first device as the first carrier.

With reference to the eighth implementation of the fourth aspect, in a ninth possible implementation, the first identifier is preconfigured, or the first identifier is configured by a network device.

It should be noted that a plurality of devices including the first device can use the first carrier to send cross-carrier scheduling information. In this case, the first carrier can carry the first identifier sent by the plurality of devices.

Alternatively, the first carrier can only be used by the first device to send the first information. In this case, the first carrier can carry only the first identifier sent by the first device.

With reference to the fourth aspect and any one of the foregoing possible implementations, in a tenth possible implementation, the first identifier is carried in a resource reservation field of sidelink control information SCI.

With reference to the fourth aspect and any one of the foregoing possible implementations, in an eleventh possible implementation, the first identifier is carried in a modulation and coding scheme MCS field in the SCI.

In this way, the receiving device can determine the carrier in the M carriers that carries the first identifier as the carrier used to carry the first information.

With reference to the fourth aspect and any one of the foregoing possible implementations, in a twelfth possible implementation, the first carrier carries a synchronization signal, and a carrier other than the first carrier in the M carriers does not carry the synchronization signal.

With reference to the fourth aspect and any one of the foregoing possible implementations, in a thirteenth possible implementation, the method further includes: determining, by the communications device, a carrier in the M carriers that carries the synchronization signal as the first carrier.

In other words, the first device sends the synchronization signal only on the first carrier, that is, does not carry the synchronization signal in a carrier other than the first carrier.

In this way, the receiving device can determine the carrier in the M carriers that carries the synchronization signal as the carrier used to carry the first information.

With reference to the fourth aspect and any one of the foregoing possible implementations, in a fourteenth possible implementation, a synchronization signal carried in the first carrier corresponds to a specified first sequence, where the first sequence is used to indicate that the carrier that carries the synchronization signal corresponding to the first sequence carries the first information.

In this case, the processor is further configured to determine a carrier in the M carriers that carries the synchronization signal corresponding to the first sequence as the first carrier.

With reference to the fourth aspect and any one of the foregoing possible implementations, in a fifteenth possible implementation, the first sequence includes a primary sidelink synchronization signal sequence or a secondary sidelink synchronization signal sequence.

In this way, based on the foregoing solutions, the receiving device can easily determine a carrier that carries the first information, so that the receiving device does not need to perform blind detection on each carrier to obtain the first information, thereby improving communication efficiency, and reducing processing load on the receiving device.

With reference to the fourth aspect and any one of the foregoing possible implementations, in a sixteenth possible implementation, a location of the first time-frequency resource on the N carriers is specified by the communications system, where the first time-frequency resource is the time-frequency resource used when the first device sends the data.

With reference to the fourth aspect and any one of the foregoing possible implementations, in a seventeenth possible implementation, a location of the first time-frequency resource on the N carriers is determined based on information of the first device, where the first time-frequency resource is the time-frequency resource used when the first device sends the data.

With reference to the fourth aspect and any one of the foregoing possible implementations, in an eighteenth possible implementation, locations of the first time-frequency resources on the N carriers are the same.

With reference to the fourth aspect and any one of the foregoing possible implementations, in a nineteenth possible implementation, the method further includes: receiving, by the communications device, second information from the first device by using the first carrier, where the second information is used to indicate a location of the first time-frequency resource on the first carrier, and the first time-frequency resource is the time-frequency resource used when the first device sends the data, where the location of the first time-frequency resource on the N carriers is the same as a time domain location of the first time-frequency resource on the first carrier.

With reference to the nineteenth implementation of the fourth aspect, in a twentieth possible implementation, the second information is specifically used to indicate an offset of the location of the first time-frequency resource that is relative to a reference location.

With reference to the fourth aspect and any one of the foregoing possible implementations, in a twenty-first possible implementation, the processor is further configured to control the transceiver to receive N pieces of third information from the first device by using the first carrier; or the processor is further configured to control the transceiver to receive one or more pieces of third indication information in the N carriers from the first device by using one or more carriers in the N carriers, where the N carriers are in a one-to-one correspondence to the N pieces of third indication information, and each piece of third information is used to indicate the location of the first time-frequency resource on a corresponding carrier, where the first time-frequency resource is the time-frequency resource used when the first device sends the data.

With reference to the twenty-first implementation of the fourth aspect, in a twenty-second possible implementation, each piece of third information is specifically used to indicate an offset of the location of the first time-frequency resource on the corresponding carrier that is relative to the reference location.

With reference to the twenty-second implementation of the fourth aspect, in a twenty-third possible implementation, the reference location is a time domain location specified by the communications system.

With reference to the twenty-second implementation of the fourth aspect, in a twenty-fourth possible implementation, the reference location is the location of the first time-frequency resource on a second carrier in the N carriers, where the second carrier is a carrier specified by the communications system.

With reference to the twenty-fourth implementation of the fourth aspect, in a twenty-fifth possible implementation, the second carrier is a primary component carrier in the N carriers.

With reference to the twenty-fourth implementation of the fourth aspect, in a twenty-sixth possible implementation, the second carrier carries a synchronization signal, and a carrier other than the second carrier in the N carriers does not carry the synchronization signal, where a location of a first time-frequency resource on the carrier that carries the synchronization signal is a reference time domain location.

With reference to the twenty-fourth implementation of the fourth aspect, in a twenty-seventh possible implementation, a synchronization signal carried in the second carrier corresponds to a specified second sequence, where the second sequence is used to indicate that a location of a first time-frequency resource on the carrier that carries the synchronization signal corresponding to the second sequence is a reference time domain location.

With reference to the twenty-first implementation of the fourth aspect, in a twenty-eighth possible implementation, the N pieces of third information are carried in sidelink control information SCI.

With reference to the twenty-first implementation of the fourth aspect, in a twenty-ninth possible implementation, each piece of third information is carried in a media access control MAC control element CE of a data packet carried by the corresponding carrier.

With reference to the fourth aspect and any one of the foregoing possible implementations, in a thirtieth possible implementation, the first information is carried in sidelink control information SCI; or the first information is carried in a media access control MAC control element CE.

With reference to the fourth aspect and any one of the foregoing possible implementations, in a thirty-first possible implementation, the second information is carried in sidelink control information SCI; or the second information is carried in a media access control MAC control element CE.

With reference to the fourth aspect and any one of the foregoing possible implementations, in a thirty-second possible implementation, the first device is a terminal device or a network device, and the communications device is a terminal device or a network device.

With reference to the fourth aspect and any one of the foregoing possible implementations, in a thirty-third possible implementation, the communications system is an Internet of Vehicles system.

According to a fifth aspect, a communications apparatus is provided, including units configured to perform the steps of the communication method in the first aspect and the implementations of the first aspect.

In a design, the communications apparatus is a communications chip, where the communications chip may include an input circuit or interface configured to send information or data, and an output circuit or interface configured to receive information or data.

In another design, the communications apparatus is a communications device (for example, a terminal device or a network device), where the communications device may include a transmitter configured to send information or data, and a receiver configured to receive information or data.

According to a sixth aspect, a communications apparatus is provided, including units configured to perform the steps of the communication method in the second aspect and the implementations of the second aspect.

In a design, the communications apparatus is a communications chip, where the communications chip may include an input circuit or interface configured to send information or data, and an output circuit or interface configured to receive information or data.

In another design, the communications apparatus is a communications device (for example, a terminal device or a network device), where the communications device may include a transmitter configured to send information or data, and a receiver configured to receive information or data.

According to a seventh aspect, a communications device is provided, including a processor and a memory. The memory is configured to store a computer program, and the processor is configured to: invoke the computer program from the memory and run the computer program, to enable the communications device to perform the communication method in the first aspect and the possible implementations of the first aspect.

Optionally, there is one or more processors, and there is one or more memories.

Optionally, the memory may be integrated with the processor, or the memory and the processor are separately disposed.

Optionally, the communications device further includes a transmitter (transmitter) and a receiver (receiver).

According to an eighth aspect, a communications device is provided, including a processor and a memory. The memory is configured to store a computer program, and the processor is configured to: invoke the computer program from the memory and run the computer program, to enable the communications device to perform the communication method in the second aspect and the implementations of the second aspect.

Optionally, there is one or more processors, and there is one or more memories.

Optionally, the memory may be integrated with the processor, or the memory and the processor are separately disposed.

Optionally, the communications device further includes a transmitter (transmitter) and a receiver (receiver).

According to a ninth aspect, a communications system is provided, including the communications devices in the seventh aspect and the eighth aspect.

According to a tenth aspect, a computer program product is provided, where the computer program product includes a computer program (which may also be referred to as code or an instruction), and when run, the computer program enables a computer to perform the method according to any one of the possible implementations of the first aspect or the second aspect.

According to an eleventh aspect, a computer-readable medium is provided, where the computer-readable medium stores a computer program (which may also be referred to as code or an instruction), and when run on a computer, the computer program enables the computer to perform the method according to any one of the possible implementations of the first aspect or the second aspect.

According to a twelfth aspect, a chip system is provided, including a processor and a memory. The memory is configured to store a computer program, and the processor is configured to: invoke the computer program from the memory and run the computer program, to enable a communications device installed with the chip system to perform the method according to any one of the possible implementations of the first aspect or the second aspect.

The chip system may include an input circuit or interface configured to send information or data, and an output circuit or interface configured to receive information or data.

A sending device is enabled to send first information on one carrier, where the first information is used to indicate a plurality of carriers used when the sending device sends data. In this way, a receiving device does not need to perform blind detection on each carrier, and can determine, based on the first information, whether each carrier is used by the sending device, thereby improving communication efficiency, and reducing processing load on the receiving device.

BRIEF DESCRIPTION OF DRAWINGS

FIG. 4 is a schematic diagram of an example of first information in this application;

FIG. 5 is a schematic diagram of another example of first information in this application;

DESCRIPTION OF EMBODIMENTS

Figure 1:
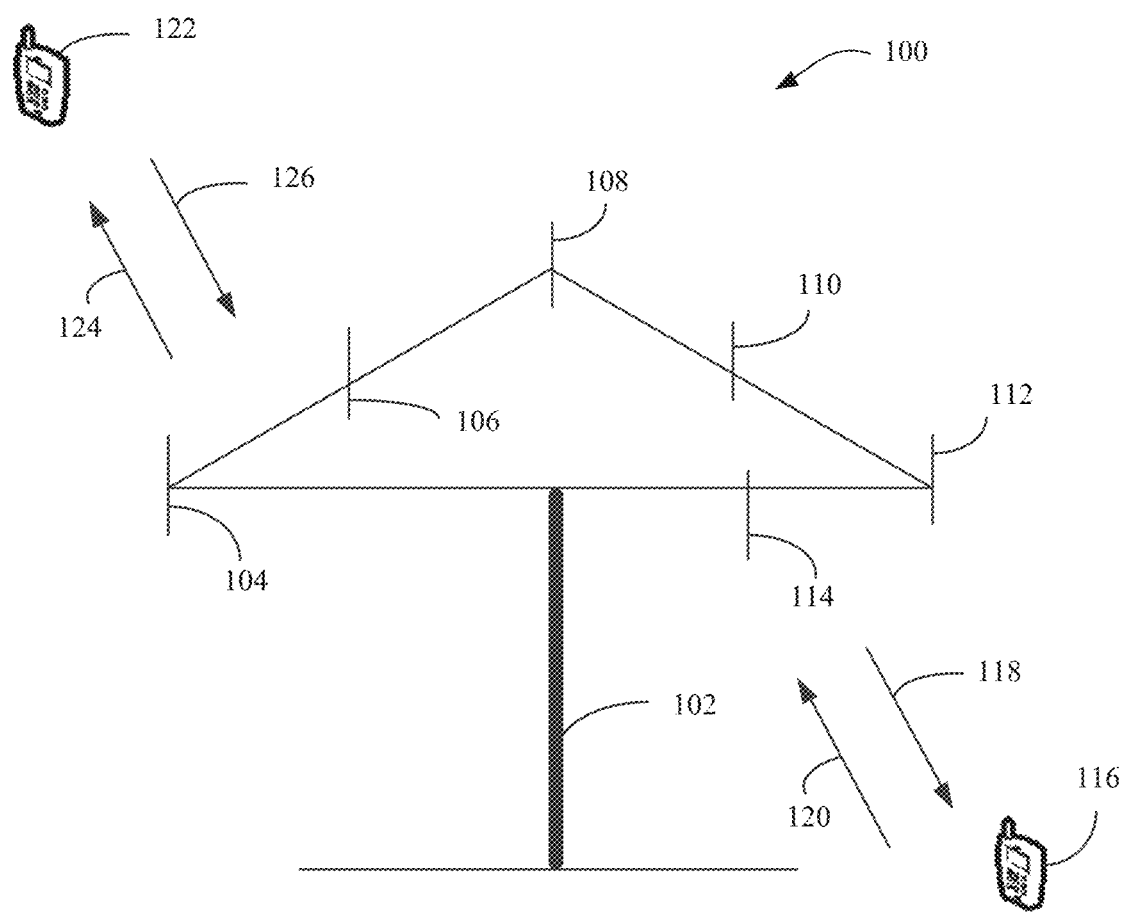
FIG. 1 is a schematic flowchart of an example of a communications system applicable to a data transmission method in this application.

The following describes technical solutions of this application with reference to accompanying drawings.

Terminologies such as "component", "module", and "system" used in this application are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both an application and a computing device and that runs on a computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and according to, for example, a signal having one or more data packets (for example, data from two components interacting with another component in a local system, a distributed system, and/or across a network such as the Internet interacting with other systems by using the signal).

The technical solutions of the embodiments of this application may be applied to various communications systems, such as: a global system for mobile communications (Global System of Mobile Communication, GSM) system, a code division multiple access (Code Division Multiple Access, CDMA) system, a wideband code division multiple access (Wideband Code Division Multiple Access, WCDMA) system, a general packet radio service (General Packet Radio Service, GPRS), a long term evolution (Long Term Evolution, LTE) system, an LTE frequency division duplex (Frequency Division Duplex, FDD) system, an LTE time division duplex (Time Division Duplex, TDD), a universal mobile telecommunications system (Universal Mobile Telecommunications System, UMTS), a worldwide interoperability for microwave access (Worldwide Interoperability for Microwave Access, WiMAX) communications system, a future 5th generation (5th Generation, 5G) system, or a new radio (New Radio, NR) system.

Generally, a conventional communications system supports a limited quantity of connections, and is also easy to be implemented. However, with the development of communications technologies, a mobile communications system not only supports conventional communication, but also supports, for example, device to device (Device to Device, D2D) communication, machine to machine (Machine to Machine, M2M) communication, machine type communication (Machine Type Communication, MTC), and vehicle to everything (Vehicle To Everything, V2X) communication such as vehicle to vehicle (Vehicle to Vehicle, V2V) communication, vehicle to infrastructure (Vehicle to Infrastructure, V2I) communication, vehicle to pedestrian (Vehicle to Pedestrian, V2P) communication, and vehicle to network (Vehicle to Network, V2N) communication.

An execution body of a data transmission method in this application (that is, a first device) may be a terminal device, or may be a network device.

The terminal device may also be referred to as user equipment (User Equipment, UE), an access terminal, a subscriber unit, a subscriber station, a mobile station, a mobile console, a remote station, a remote terminal, a mobile device, a user terminal, a terminal, a wireless communications device, a user agent, a user apparatus, or the like. The terminal device may be a station (STATION, ST) in a WLAN, a cellular phone, a cordless phone, a session initiation protocol (Session Initiation Protocol, SIP) phone, a wireless local loop (Wireless Local Loop, WLL) station, a personal digital assistant (Personal Digital Assistant, PDA) device, a handheld device that has a wireless communication function, a computing device or another processing device connected to a wireless modem, an in-vehicle device, an Internet of Vehicles terminal, a computer, a laptop computer, a handheld communications device, a handheld computing device, a satellite wireless device, a wireless modem card, a set top box (set top box, STB), customer premise equipment (customer premise equipment, CPE) and/or another device configured to perform communication in a wireless system and a terminal device in a next-generation communications system, for example, a terminal device in the 5G network or a terminal device in a future evolved public land mobile network (Public Land Mobile Network, PLMN).

By way of example but not limitation, in the embodiments of this application, the terminal device may also be a wearable device. A wearable device may also be referred to as a wearable intelligent device, and is a general term of wearable devices, such as glasses, gloves, watches, clothes, and shoes, that are developed by applying wearable technologies to intelligent designs of daily wear. A wearable device is a portable device that is directly worn on a body or integrated into clothes or an accessory of a user. A wearable device is not merely a hardware device, but is configured to implement a powerful function through software support, data exchange, and cloud interaction. Generalized wearable intelligent devices include full-featured and large-size devices that can implement complete or partial functions without depending on smartphones, such as smart watches or smart glasses, and devices that focus only on one type of application function and need to work with other devices such as smartphones, such as various smart bands or smart jewelry for monitoring physical signs.

In addition, in the embodiments of this application, the terminal device may further be a terminal device in the Internet of Things (Internet of Things, IoT) system. The IoT is an important part of information technology development in the future, and a main technical feature of the IoT is to connect objects to the network through the communications technology, to implement an intelligent network of human-machine interconnection, and object-object interconnection.

The network device may include an access network device, a core network device, or the like.

The access network device may be a device configured to communicate with a mobile device. The access network device may be an access point (Access Point, AP) in a WLAN or a base transceiver station (Base Transceiver Station, BTS) in GSM or CDMA, or may be a NodeB (NodeB, NB) in WCDMA, or may be a gNB in a new radio (New Radio, NR) system; or may be an evolved NodeB (Evolutional Node B, eNB or eNodeB) in LTE, or a relay station or an access point, or a roadside unit (Roadside Unit, RSU), or an in-vehicle device, a wearable device, and an access network device in a future 5G network, or an access network device in a future evolved PLMN network, or the like.

In addition, in the embodiments of the present invention, the access network device provides a service for a cell, and the terminal device communicates with the access network device by using a transmission resource (for example, a time-frequency resource, a frequency resource or a spectrum resource) used by the cell. The cell may be a cell corresponding to the access network device (for example, a base station). The cell may belong to a macro base station, or may belong to a base station corresponding to a small cell (Small cell). The small cell herein may include: a metro cell (Metro cell), a micro cell (Micro cell), a pico cell (Pico cell), a femto cell (Femto cell), and the like. These small cells have features of small coverage and low transmit power, and are suitable for providing high-rate data transmission services.

In addition, a plurality of cells may operate on a same frequency on a carrier in an LTE system or a 5G system. In some special scenarios, it may also be considered that a concept of the foregoing carrier is equivalent to that of a cell. For example, in a carrier aggregation (Carrier Aggregation, CA) scenario, when a secondary component carrier is configured for UE, a carrier index of the secondary component carrier and a cell identity (Cell Identity, Cell ID) of a secondary serving cell operating on the secondary component carrier are both carried. In this case, it may be considered that a concept of a carrier is equivalent to that of a cell, for example, access by UE to a carrier is equivalent to access to a cell.

In addition, the concept of the carrier (carrier) in the embodiments of the present invention is the same as that of the carrier in a carrier aggregation (carrier aggregation), and the carrier may be further understood as a band (band), a sub-band (sub-band), a bandwidth part (Bandwidth part, BWP), a channel (channel), a sub-channel (sub-channel), or a segment of spectrum resource and the like, and is presented as a subcarrier set in frequency domain. Different carriers or bands may have different center frequency channel numbers, and may have the same center frequency channel number, for example, bands with different bandwidths but the same center frequency channel number.

A core network device may be connected to a plurality of access network devices, and is configured to control the access network devices, and may distribute data received from a network side (for example, the Internet) to the access network devices.

Functions and specific implementations of the foregoing listed terminal device, access network device and core network device are only described as examples. The present invention is not limited thereto.

In the embodiments of the present invention, the terminal device or the network device includes a hardware layer, an operating system layer run above the hardware layer, and an application layer run above the operating system layer. The hardware layer includes hardware such as a central processing unit (Central Processing Unit, CPU), a memory management unit (Memory Management Unit, MMU), and a memory (also referred to as a main memory). The operating system may be any one or more computer operating systems such as a Linux operating system, a Unix operating system, an Android operating system, an iOS operating system, or a windows operating system that implement service processing by using a process (Process). The application layer includes an application such as a browser, an address book, word processing software, or instant messaging software. In addition, a specific structure of an execution body of the method provided in the embodiments of the present invention is not particularly limited in the embodiments of present invention, provided that communication can be performed based on the method provided in the embodiments of the present invention by running a program of code recording the method provided in the embodiments of the present invention. For example, the execution body of the method provided in the embodiments of the present invention may be a terminal device or a network device, or a functional module that is in a terminal device or a network device and that can invoke a program and execute the program.

In addition, aspects or features in the embodiments of the present invention may be implemented as a method, an apparatus or a product that uses standard programming and/or engineering technologies. The term "product" used in this application covers a computer program that can be accessed from any computer-readable component, carrier or medium. For example, the computer-readable medium may include but is not limited to: a magnetic storage component (for example, a hard disk, a floppy disk or a magnetic tape), an optical disc (for example, a compact disc (Compact Disc, CD), a digital versatile disc (Digital Versatile Disc, DVD)), a smart card and a flash memory component (for example, erasable programmable read-only memory (Erasable Programmable Read-Only Memory, EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, contain, and/or carry an instruction and/or data.

It should be noted that, in the embodiments of the present invention, a plurality of application programs can be run on an application layer. In this case, an application program that performs the communication method of the embodiments of the present invention may be an application program different from that configured to control a receiving device to complete an action corresponding to the received data.

FIG. 1 is a schematic diagram of a system 100 applicable to a communication method according to an embodiment of the present invention. As shown in FIG. 1, the system 100 includes an access network device 102. The access network device 102 may include one or more antennas, for example, antennas 104, 106, 108, 110, 112, and 114. In addition, the access network device 102 may additionally include a transmitter chain and a receiver chain, and a person of ordinary skill in the art may understand that both the transmitter chain and the receiver chain may include a plurality of components (for example, a processor, a modulator, a multiplexer, a demodulator, a demultiplexer or an antenna) related to signal sending and receiving.

The access network device 102 may communicate with a plurality of terminal devices (for example, a terminal device 116 and a terminal device 122). However, it may be understood that the access network device 102 can communicate with any quantity of terminal devices similar to the terminal device 116 or the terminal device 122. The terminal device 116 and the terminal device 122 may be, for example, a cellular phone, a smartphone, a portable computer, a handheld communications device, a handheld computing device, a satellite radio apparatus, a global positioning system, a PDA, and/or any other suitable device used for communication in the wireless communications system 100.

As shown in FIG. 1, the terminal device 116 communicates with the antenna 112 and the antenna 114. The antenna 112 and the antenna 114 send information to the terminal device 116 by using a forward link (which is also referred to as a downlink) 118, and receive information from the terminal device 116 by using a reverse link (which is also referred to as an uplink) 120. In addition, the terminal device 122 communicates with the antenna 104 and the antenna 106. The antenna 104 and the antenna 106 send information to the terminal device 122 by using a forward link 124, and receive information from the terminal device 122 by using a reverse link 126.

For example, in a frequency division duplex (Frequency Division Duplex, FDD) system, the forward link 118 and the reverse link 120 may use different bands, and the forward link 124 and the reverse link 126 may use different hands.

For another example, in a time division duplex (Time Division Duplex, TDD) system and a full duplex (Full Duplex) system, the forward link 118 and the reverse link 120 may use a same band, and the forward link 124 and the reverse link 126 may use a same band.

Each antenna (or an antenna group including a plurality of antennas) and/or an area designed for communication are/is referred to as a sector of the access network device 102. For example, an antenna group may be designed to communicate with a terminal device in a sector within a coverage area of the access network device 102. An access network device can send signals to all terminal devices in a sector corresponding to the access network device by using a single antenna or a multi-antenna transmit diversity. In a process in which the access network device 102 communicates with the terminal devices 116 and 122 respectively by using the forward links 118 and 124, a transmit antenna of the access network device 102 may also improve signal-to-noise ratios of the forward links 118 and 124 through beamforming. In addition, as compared with a manner in which an access network device sends signals to all terminal devices of the access network device by using a single antenna, or a multi-antenna transmit diversity, when the access network device 102 sends, through beamforming, signals to the terminal devices 116 and 122 that are randomly dispersed in a related coverage area, a mobile device in a neighboring cell suffers less interference.

In a given time, the access network device 102, the terminal device 116, or the terminal device 122 may be a wireless communications sending apparatus and/or a wireless communications receiving apparatus. During data transmission, the wireless communications sending apparatus may encode data for transmission. Specifically, the wireless communications sending apparatus may obtain (for example, generate, receive from another communications apparatus, or store in a memory) a given quantity of data bits that need to be sent to the wireless communication receiving apparatus through a channel. Such data bits may be included in a transport block (or a plurality of transport blocks) of data, and the transport block may be segmented to generate a plurality of code blocks.

In addition, the communications system 100 may be a PLMN network, a D2D network, an M2M network, an IoT network, or another network. FIG. 1 is only a simplified schematic diagram as an example, and the network may further include another access network device, not shown in FIG. 1.

A network device in a network, a network device in the future evolved PLMN network, or the like is not limited in the embodiments of this application.

By way of example but not limitation, the data transmission method in this application may be applied to the Internet of Vehicles system. A research range of the Internet of Vehicles (V2X) includes vehicle to vehicle (V2V) communication, vehicle to pedestrian (V2P) communication and vehicle to infrastructure (V2I) network communication. Communication in the V2X may be implemented based on a sidelink (Sidelink) interface, or a Uu interface. Currently, the Internet of Vehicles system can support up to eight PC5 carriers, where the PC5 is a carrier aggregation of a reference point that is used for discovery and communication between UEs in a protocol architecture.

Figure 2:
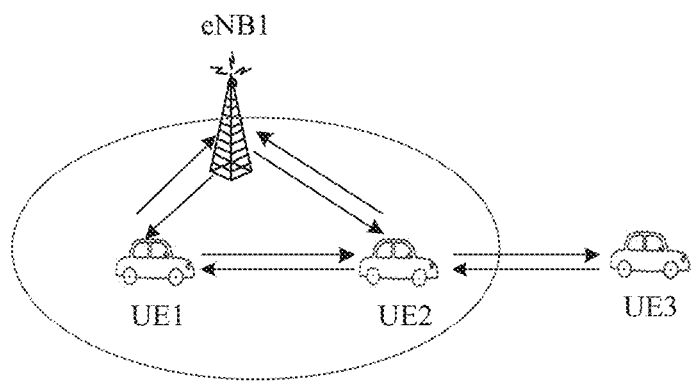
FIG. 2 is a schematic flowchart of another example of a communications system applicable to a data transmission method in this application.

FIG. 2 is a schematic diagram of an Internet of Vehicles communications system. Terminals can directly communicate with each other by using a sidelink interface. When a terminal is within a signal coverage of a network device such as a base station, the terminal can communicate with the base station.

Currently, the Internet of Vehicles system may include the following three multi-carrier using scenarios.

Scenario 1: A plurality of medium access control protocol data units (Medium Access Control Protocol Data Unit, MAC PDU) are transmitted in parallel. "Parallel" transmission includes simultaneous or non-simultaneous transmission on different carriers. MAC PDUs transmitted on the carriers have different load.

Scenario 2: A same data packet is repeatedly transmitted on different carriers in parallel. "Parallel" transmission includes simultaneous or non-simultaneous transmission on different carriers.

Scenario 3: Capacity increase from the perspective of a receiving device. From the perspective of the receiving device, it is assumed that the receiving device may receive simultaneously on a plurality of carriers. From the perspective of a sending device, the sending device may send on a group of carriers. For example, one UE sends on a single carrier (for each UE, the carrier may be different), but may receive on all carriers. In this case, the receiving UE may find more other UEs, and this means channel capacity increase.

In the existing V2X technology, the UE sends sidelink control information (Sidelink Control Information, SCI) and data only on one carrier, where the sidelink control information is transmitted on a physical sidelink control channel (Physical Sidelink Control Channel, PSCCH), and the data (Data) is transmitted on a physical sidelink shared channel (Physical Sidelink Shared Channel, PSSCH). In the existing V2X technology, the sidelink control information and the data (Data) always appear in pairs. In other words, each Data packet transmitted on the PSSCH has corresponding control information transmitted on the PSCCH, where the control information is used to indicate a transmission resource of the data packet. In a future V2X evolved technology, there may be no correspondence between the sidelink control information and the Data. For example, the sidelink control information and the Data may share the control information, while the control information does not indicate a transmission resource of a specific data packet. In the embodiments of the present invention, without concept confusion, the data is a broad concept, which may represent the control information transmitted on the control channel, may represent the data transmitted on the shared channel, and may represent both the control information transmitted on the control channel and the data transmitted on the shared channel. In a 3GPP V2X standard, that the UE sends the SCI may be expressed as that the UE transmits the PSCCH (transmit the PSCCH), and that the UE sends Data may be expressed as that the UE transmits the PSSCH (transmit the PSSCH). Therefore, in the embodiments of the present invention, that the UE transmits data may be represented as one of the following: that the UE transmits the PSCCH, that the UE transmits the PSSCH, and that the UE transmits the PSCCH and the PSSCH. The sidelink control information sent by the UE only indicates a resource reserved when the UE transmits the SCI and the Data on the carrier in a future period of time, and cannot indicate a resource reserved on another carrier. Therefore, based on the existing resource reservation indication method, when one UE transmits on a plurality of carriers, a receive-end needs to perform blind detection on the plurality of carriers to know whether the corresponding UE reserves the resource on the plurality of carriers and a reserved location of the resource. For a terminal with a limited receiving capability, carrier handover may need to be performed. Blind handover may reduce the receiving capability, because handover to a carrier may cause the Internet of Vehicles information on another carrier to be missed. In this case, if a sending end UE can indicate cross-carrier scheduling information thereof, blind detection and blind handover by the receive-end may be reduced. In addition, for a terminal with a limited capability to support multi-carrier, if the terminal can obtain resource reservation information of another UE on another carrier when selecting a resource, the terminal with a limited capability to support multi-carrier can perform resource selection on the corresponding carrier based on the indication information, thereby reducing energy consumption brought by listening on the another carrier. In addition, in the future, a large data packet may be supported for transmission on a plurality of carriers. In this case, to help the receiving end UE to receive and combine data packets on the plurality of carriers, the sender UE needs to indicate the cross-carrier scheduling information. A cross-carrier indication manner needs to be designed in all these scenarios. The solution in this application may be applied to the multi-carrier transmission procedure of the Internet of Vehicles system.

A time-frequency resource used for wireless communication in the communications system 100 is described in detail in the following.

In the embodiments of the present invention, the time-frequency resource may include a plurality of dimensions such as a time domain, a frequency domain, a space domain and a code domain.

For example, in this application, the time-frequency resource may be divided into a plurality of time units in time domain.

In addition, in the embodiments of the present invention, the plurality of time units may be contiguous, or there may be a preset interval between some neighboring time units. This is not particularly limited in the embodiments of the present invention.

In the embodiments of the present invention, the time unit may be a time unit used for at least one of uplink information (for example, uplink data) transmission, downlink information (for example, downlink data) transmission, and sidelink information (for example, sidelink data) transmission.

In the embodiments of the present invention, a length of one time unit may be randomly set. This is not particularly limited in the embodiments of the present invention.

For example, one time unit may include one or more subframes.

Alternatively, one time unit may include one or more slots.

Alternatively, one time unit may include one or more symbols.

Alternatively, one time unit may include one or more transmission time intervals (Transmission Time Interval, TTI).

Alternatively, one time unit may include one or more short transmission time intervals (short Transmission Time Interval, sTTI).

For another example, in this application, the time-frequency resource may be divided into a plurality of carriers or a plurality of bands in frequency domain.

Moreover, each carrier or band may be divided into a plurality of subcarriers.

A time-frequency resource uniquely determined by a subcarrier and a symbol may be referred to as a resource element (Resource Element, RE), and a plurality of REs located in a specified time domain range and frequency domain range may form a resource block (Resource Block, RB).

In other words, in the embodiments of the present invention, "a location of a time-frequency resource" may refer to a time domain location and/or a frequency domain location of the time-frequency resource.

A specific procedure of a data transmission method 200 in an embodiment of the present invention is described in detail below with reference to FIG. 3.

The method 200 may be applied to a communications system that can use a plurality of carriers (that is, an example of M carriers), for example, an Internet of Vehicles system.

The method 200 may relate to a procedure in which a device #A (that is, an example of a first device) indicates a time-frequency resource (that is, an example of a first time-frequency resource, which, for ease of understanding and description, is denoted as a time-frequency resource #A in the following) used when sending data.

The device #A may be a network device example, an access network device such as a base station), or the device #A may also be a terminal device such as an in-vehicle device or a mobile phone.

It should be noted that in this application, the device #A can support communication based on all of the M carriers or, the device #A can support communication based on some of the M carriers. This is not particularly limited in this application.

For example, the device #A can determine N carriers from the M carriers in a time period #a, where the N carriers may be carriers used when the device #A sends data (which, for ease of understanding and description, is denoted as data #A in the following) in a time period #b. In other words, the time-frequency resource #A is distributed on the N carriers. For example, the time-frequency resource #A may include a time-frequency resource #Ai on the $i^{th}$ carrier, where i□[1, N]. To be specific, the time-frequency resource #A includes a time-frequency resource #A1, a time-frequency resource #A2, . . . , the time-frequency resource #Ai, . . . , and a time-frequency resource #AN. M is an integer greater than or equal to 2, N is an integer greater than or equal to 2, and N is less than or equal to M. The time period #a is not later than the time period #b.

Figure 3:
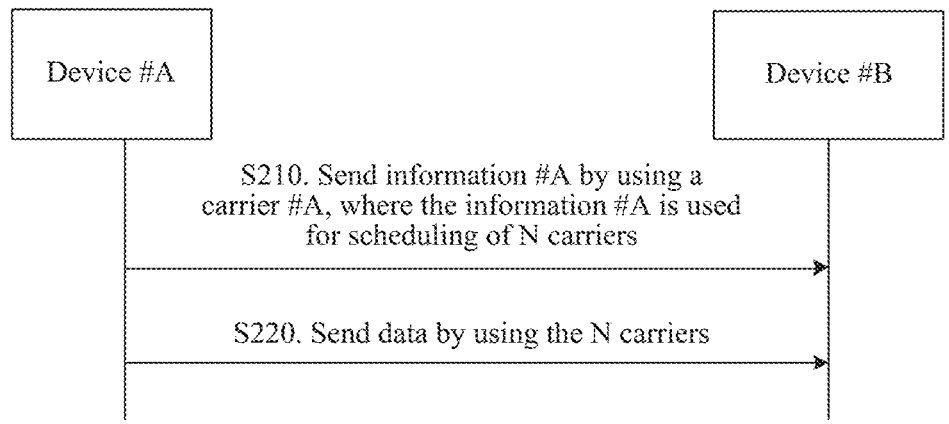
FIG. 3 is a schematic interaction diagram of a data transmission method in this application.

As shown in FIG. 3, in S210, the device #A can send information #A (that is, an example of first information) by using a carrier #A (that is, an example of a first carrier) in the M carriers.

The information #A is used to indicate that the device #A sends data (including at least one of control information and Data) by using the N carriers. In other words, the information #A may be used to indicate which carriers in the M carriers are the carriers used when the device #A sends the data.

For example, the data #A may be data sent by the terminal device to a receiving device. In this case, the device #A can send the information #A to the receiving device in a unicast manner. It should be understood that the sending manner described above is only an example. The device #A can send the information #A in the unicast manner, a multicast manner or a broadcast manner, provided that it can be ensured that the receiving device that receives the data can receive the information #A. This is not particularly limited in this application.

For another example, the data #A may be data sent by the terminal device to a plurality of receiving devices. In this case, the device #A can send the information #A to the plurality of receiving devices in the multicast manner or the broadcast manner.

The receiving device that receives the data may be a network device (for example, an access network device such as a base station), or the receiving device may also be a terminal device such as an in-vehicle device or a mobile phone.

For ease of understanding and description, a device #B is used as an example in the following to describe actions of the receiving device.

A specific form of the information #A is described as an example in the following.

Format 1

In this embodiment of this application, the information #A includes M-1 bits, the M-1 bits may be in a one-to-one correspondence to M-1 carriers other than the carrier #A in the M carriers, where the $j^{th}$ bit in the information #A is used to indicate whether the carrier corresponding to the $j^{th}$ bit belongs to the N carriers. In other words, the $j^{th}$ bit in the information #A is used to indicate whether the carrier corresponding to the $j^{th}$ bit is used by the device #A to transmit the data, where j□[1, M-1].

For example, when the carrier corresponding to the $j^{th}$ bit belongs to the N carriers (or in other words, the carrier corresponding to the $j^{th}$ bit is used by the device #A to send the data), the value of the $j^{th}$ bit may be 1. Correspondingly, when the carrier corresponding to the $j^{th}$ bit does not belong to the N carriers (or in other words, the carrier is not used by the device #A to send the data), the value of the $j^{th}$ bit may be 0.

It should be understood that the relationship between the value of the foregoing bit and whether the carrier corresponding to the bit is used for data transmission is only described as an example. The present invention is not limited thereto. For example, when the carrier corresponding to the $j^{th}$ bit belongs to the N carriers (or in other words, the carrier is used by the device #A to send the data), the value of the $j^{th}$ bit may be 0. Correspondingly, when the carrier corresponding to the $j^{th}$ bit does not belong to the N carriers (or in other words, the carrier corresponding to the $j^{th}$ bit is not used by the device #A to send the data), the value of the $j^{th}$ bit may be 1.

By way of example but not limitation, for example, a quantity of carriers that may be used by the communications system is 8. In this case, the information #A may include seven bits.

For example, as shown in FIG. 4, if the carrier #A is carrier #6, and if a carrier used by the device #A to send data is carrier #0, carrier #2, or carrier #7, a bit included in the information #A may be 1010001.

For another example, as shown in FIG. 5, if the carrier #A is carrier #1, and if a carrier used by the device #A to send data is carrier #0, carrier #2, or carrier #7, a bit included in the information #A may be 1100001.

It should be noted that the carrier #A may belong to the N carriers, or may not belong to the N carriers. This is not particularly limited in the present invention. Therefore, in this embodiment of the present invention, manners in the following may be used to determine whether the carrier #A belongs to the N carriers.

Manner a: a communications system or a communications protocol can specify that the carrier #A (that is, a carrier that carries first information) belongs to the N carriers (that is, carries used by a device that sends the first information to send data).

Manner b: a communications system or a communications protocol can specify that the carrier #A (that is, a carrier that carries first information) does not belong to the N carriers (that is, carries used by a device that sends the first information to send data).

Manner c: a device #B can perform blind detection on the carrier #A when receiving data, to determine whether the carrier #A (that is, a carrier that carries first information) belongs to the N carriers (that is, carries used by a device that sends the first information to send data).

Manner d: before sending data by using the carrier #A, the device #A can send information #B by using the carrier #A, where the information #B is used to indicate a time-frequency resource that is of the carrier #A and that is occupied by the device #A, so that the device #B can determine, based on whether the carrier #A carries the information #B, whether the carrier #A (that is, a carrier that carries first information) belongs to the N carriers (that is, carries used by a device that sends the first information to send data).

Moreover, by way of example but not limitation, the information #B may be carried in a media access control (Media Access Control, MAC) control unit (Control Element, CE) in a data packet, where the data packet may be a data packet formed after the device #A encapsulates data that needs to be sent. Alternatively, the information #B can be carried in SCI.

In addition, by way of example but not limitation, the information #A can be carried in the SCI. For example, the information #A may use some or all of bits in the SCI, for example, seven bits in reserved bits in the SCI.

Format 2

In this embodiment of this application, the information #A includes M bits, the M bits may be in a one-to-one correspondence to M carriers, where the $j^{th}$ bit in the information #A is used to indicate whether the carrier corresponding to the $j^{th}$ bit belongs to the N carriers. In other words, the $j^{th}$ bit in the information #A is used to indicate whether the carrier corresponding to the $j^{th}$ bit is used by the device #A to transmit the data, where $j\square[1, M]$.

For example, when the carrier corresponding to the $j^{th}$ bit belongs to the N carriers (or in other words, the carrier corresponding to the $j^{th}$ bit is used by the device #A to send the data), the value of the $j^{th}$ bit may be 1. Correspondingly, when the carrier corresponding to the $j^{th}$ bit does not belong to the N carriers (or in other words, the carrier corresponding to the $j^{th}$ bit is not used by the device #A to send the data), the value of the $j^{th}$ bit may be 0.

It should be understood that the relationship between the value of the foregoing bit and whether the carrier corresponding to the bit is used for data transmission is only described as an example. The present invention is not limited thereto. For example, when the carrier corresponding to the $j^{th}$ bit belongs to the N carriers (or in other words, the carrier is used by the device #A to send the data), the value of the $j^{th}$ bit may be 0. Correspondingly, when the carrier corresponding to the $j^{th}$ bit does not belong to the N carriers (in other words, the carrier is not used by the device #A to send the data), the value of the $j^{th}$ bit may be 1.

By way of example but not limitation, for example, a quantity of carriers that may be used by the communications system is 8. In this case, the information #A may include eight bits.

In addition, by way of example but not limitation, the information #A can be carried in the SCI. For example, the information #A may use some or all of reserved bits in the SCI, for example, eight bits in the reserved bits in the SCI.

Format 3

In this embodiment of the present invention, a unique identifier may be assigned to each carrier in the M carriers.

In this way, the information #A may include the identifier of each carrier in the N carriers. Further, after receiving the information #A, the device #B can determine the N carriers based on N identifiers included in the information #A, so that the device #B can determine that the device #A needs to send data by using the N carriers.

Alternatively, the information #A may include identifiers of M-N carriers other than the N carriers in the M carriers. Further, after receiving the information #A, the device #B can determine the M-N carriers based on the M-N identifiers included in the information #A, so that the device #B can determine that carriers used by the device #A are N carriers other than the M-N carriers in the M carriers.

In addition, by way of example but not limitation, the information #A can be carried in the SCI. For example, the information #A may occupy some or all of bits in the SCI.

A manner of determining the carrier #A is described in detail in the following.

By way of example but not limitation, in this embodiment of this application, the carrier #A may be determined in at least one of the following manners.

Manner a

In this embodiment of this application, the carrier #A may be a carrier specified by the communications system or the communications protocol.

For example, the communications system or the communications protocol can configure one carrier in the M carriers as a scheduling carrier, where the scheduling carrier may be configured to carry information that is sent by the sending device and that is used to indicate a carrier used when the sending device sends data, for example, the information #A, so that the device #A can determine the scheduling carrier as the carrier #A, and the device #B can detect, on the scheduling carrier, the information #A sent by the device #A.

Moreover, by way of example but not limitation, when the M carriers include primary component carriers and secondary component carriers, the carrier #A may be a primary component carrier in the M carriers.

The primary component carriers may be public carriers configured by the communications system.

Manner b

In this embodiment of the present invention, for example, a network device can divide L terminals into groups, to determine K (K≤L) device groups. There may be a one-to-one mapping relationship between K carriers in the M carriers and the K device groups. The $k^{th}$ carrier in the K carriers is configured to carry first information (for example, the information #A) sent by a device in a device group corresponding to the $k^{th}$ carrier, where the first information may be used to indicate information of a carrier used when the device sends data, where $k\square[1, K]$. In this case, the device #A and the device #B can determine a device group to which the device #A belongs (which, for ease of understand and description, is denoted as a device group #A), and determine, based on the mapping relationship, a carrier corresponding to the device group #A, and use the carrier corresponding to the device group #A as the carrier #A.

Manner c

In this embodiment of the present invention, the device #A can determine any one of the M carriers as the carrier #A.

In this case, to enable the device #B to identify the carrier #A from the M carriers, at least one of the processing methods in the following may be used.

Processing Method 1

Specifically, the communications system or the communication protocols can specify an identifier #α (that is, an example of a first identifier). The identifier #α may have the following functions: When a device receives the identifier #α, the device can determine that indication information of a carrier used when the sending device sends data is carried in a carrier that carries the identifier #α. In other words, the carrier that carries the identifier #α may be determined as the scheduling carrier In this case, the device #A can send the identifier #α by using the carrier #A, so that when detecting the identifier #α in the carrier #A, the device #B can determine that the information #A is carried in the carrier #A.

By way of example but not limitation, for example, the identifier #α may be carried in a resource reservation (Resource reservation) field (or, may be referred to as "domain") in the SCI. In this case, the value of the identifier #α may include but is not limited to one of "1101", "1110" or "1111".

For another example, the identifier #α may be carried in a modulation and coding scheme (Modulation and coding scheme, MCS) field in the SCI. It should be noted that because the identifier #α occupies the MCS field, in this case, the value of the MCS used to transmit data may be a default value specified by the communications system or the communications protocol.

For another example, the identifier #α can be indicated by that the sending device sends the information #A only on a specific carrier (for example, the carrier #A). In other words, the sending device does not send the information #A on a carrier other than the specific carrier. Therefore, when detecting the information #A on the carrier #A, the device #B can determine that the sending device indicates an implicit information identifier #α on the carrier #A by sending the information #A, thereby determining that the carrier is the scheduling carrier of the sending device, that is, the carrier #A.

It should be understood that the foregoing understood manner of sending the identifier #α is only described as an example. This is not particularly limited in this application. For example, the identifier #α may also be separately sent as independent information.

Processing Method 2

Specifically, the communications system or the communications protocol can specify that the sending device sends a synchronization signal only on the scheduling carrier (that is, a carrier carrying the first information, where the first information is used to indicate a carrier used when the sending device sends data), that is, does not send the synchronization signal on a non-scheduling carrier (that is, a carrier not carrying the first information).

In this case, the device #A can send the synchronization signal on the carrier #A, so that when detecting the synchronization signal in the carrier #A, the device #B can determine that the information #A is carried in some data sent by the device #A on the carrier #A.

Processing Method 3

Specifically, the communications system or the communication protocols can specify a specific sequence #β (that is, an example of a first sequence). The identifier #β may have the following function: When a device receives a synchronization signal (or, a reference signal) corresponding to the identifier #β, the device can determine that indication information of a carrier used when the sending device sends data is carried in the carrier that carries the synchronization signal corresponding to the identifier #β. In other words, the carrier that carries the synchronization signal corresponding to the identifier #β may be determined as the scheduling carrier.

By way of example but not limitation, for example, the synchronization signal may be a primary sidelink synchronization signal (Primary Sidelink Synchronization Signal, PSSS). In this case, the sequence #β may be a sequence used to generate the PSSS.

For another example, the synchronization signal may be a secondary sidelink synchronization signal (Secondary Sidelink Synchronization Signal, SSSS). In this case, the sequence #β may be a sequence used to generate the SSSS.

It should be noted that in this embodiment of the present invention, the carrier #A may belong to the N carriers. In other words, the carrier #A may be a carrier used when the device #A sends the data. Alternatively, the carrier #A may not belong to the N carriers. In other words, the device #A does not use the carrier #A when sending the data.

For example, by way of example but not limitation, in this embodiment of the present invention, the device #A may also send information #C on the carrier #A, where the information #C may be used to indicate whether the carrier #A is used by the device #A to send the data. Moreover, by way of example but not limitation, the information #C and the information #A are carried in a same message or same information. For example, the information #C and the information #A may be carried in different fields of the SCI. Alternatively, the information #C and the information #A may be carried in different messages or information. For example, the information #A may be carried in the SCI, and the information #C may be carried in the MAC CE, in the data packet.

Alternatively, the communications system or the communications protocol can specify that a carrier that carries first indication information is used by the sending device to send the data. In this case, when receiving the information #A by using the carrier #A, the device #B can determine that the carrier #A is used by the device #A to send the data.

Alternatively, the communications system or the communications protocol can specify that a carrier that carries first indication information cannot be used by the sending device to send the data. In this case, when receiving the information #A by using the carrier #A, the device #B can determine that the carrier #A is not used by the device #A to send the data.

In this way, in the foregoing manner, a process in which the device #A and the device #B transmit the information #A by using the carrier #A can be implemented.

In this embodiment of this application, the device #A can further send information #D (that is, second indication information), where the information #D may be used to indicate the location of the time-frequency resource (that is, the time-frequency resource #A1, the time-frequency resource #A2, . . . , the time-frequency resource #Ai, . . . , and the time-frequency resource #AN) used by the device #A to transmit the data in the N carriers.

The location of the time-frequency resource may refer to a time domain location of the time-frequency resource, for example, a subframe, a slot or a symbol corresponding to the time-frequency resource.

Alternatively, the location of the time-frequency resource may refer to a frequency domain location of the time-frequency resource, for example, a subcarrier corresponding to the time-frequency resource.

Alternatively, the location of the time-frequency resource may refer to the frequency domain location and the time domain location of the time-frequency resource, for example, a resource element (Resource Element, RE), a resource block (Resource Block, RB), a resource element group (Resource Element Group, REG), and a resource block group (Resource Block Group, RBG) corresponding to the time-frequency resource.

By way of example but not limitation, in this embodiment of the present invention, any one of the following manners may be used to send the information #D.

Manner A

In this embodiment of the present invention, the information #D may be carried in control information (for example, the SCI).

In this case, the information #A and the information #D may be carried in a same message or same information. For example, the information #D and the information #A may be carried in different fields of the SCI. In other words, the information #D and the information #A may be sent together by the device #A in S210. Alternatively, the information #D and the information #A may be separately sent by the device #A in different steps. Moreover, the information #D and the information #A may be carried in different fields, domains or information. This is not particularly limited in the present invention.

For example, a location of the time-frequency resource that is on each of the N carriers and that is used by the device #A to transmit data may be the same. In this case, the information #D may indicate only the same location of the time-frequency resource.

For another example, the information #D may include N pieces of subinformation, where the N pieces of subinformation are in a one-to-one correspondence to the N time-frequency resources (that is, the time-frequency resource #A1, the time-frequency resource #A2, . . . , the time-frequency resource #Ai, . . . , and the time-frequency resource #AN), and each piece of subinformation is used to indicate the location of the time-frequency resource corresponding to the subinformation.

Manner B

In this embodiment of the present invention, the information #D may be carried in the MAC CE of the data packet. The device #A may send the information #D on the MAC CE of the data packet sent on the carrier #A; or, the device #A may also carry the information #D in the data packet and send the information #D in subsequent S220.

For example, a location of the time-frequency resource element that is on each of the N carriers and that is used by the device #A to transmit data may be the same. In this case, the information #D may indicate only the same location of the time-frequency resource.

For another example, the information #D may include N pieces of subinformation, where the N pieces of subinformation are in a one-to-one correspondence to the N time-frequency resources (that is, the time-frequency resource #A1, the time-frequency resource #2, . . . , the time-frequency resource #Ai, . . . , and the time-frequency resource #AN), and each piece of subinformation is used to indicate the location of the time-frequency resource corresponding to the subinformation.

The N pieces of subinformation may be carried in a same MAC CE, where the same MAC CE may be a MAC CE in the data packet that is sent by the device A and that is carried in any one of the N carriers; or the same MAC CE may be the MAC CE in the data packet that is sent by the device A and that is carried in the carrier #A.

Alternatively, the N pieces of subinformation may be carried in different MAC CEs. For example, the $n^{th}$ subinformation may be carried in a MAC CE in a data packet on a carrier to which a time-frequency resource corresponding to the $n^{th}$ subinformation belongs, where n belongs to [1, N].

Specific content indicated by the information #D is described in detail in the following.

In this embodiment of this application, the information #D may indicate at least one piece of the following content.

Content 1

A location of the time-frequency resource in a system frame number (System Frame Number, SFN) period or direct frame number (Direct Frame Number, DFN), for example, a subframe number of a subframe in which a time-frequency resource is carried.

Content 2

An offset of the time-frequency resource that is relative to a reference location, for example, a time domain offset of a time domain location of a time-frequency resource that is relative to a reference time domain location.

The reference location may be a location of the time-frequency resource used by the device #A on the carrier #B.

Moreover, the carrier #B may be any carrier in the N carriers, or the carrier #B may be the same as the carrier #A. This is not particularly limited in the present invention.

Moreover, when the carrier #B is any carrier in the N carriers, to enable the device #B to reliably determine the carrier #B, this application can provide at least one of the following processing methods.

Processing Method A

Specifically, the communications system or the communication protocols can specify an identifier #γ (that is, an example of a second identifier). The identifier #γ may have the following function: When a device receives the identifier #γ, the device can determine that a location of the time-frequency resource used by the sending device in a carrier that carries the identifier #γ is the reference location.

In this case, the device #A can send the identifier #γ by using the carrier #B, so that when detecting the identifier #γ in the carrier the device #B can determine that a location of the time-frequency resource used by the device #A in the carrier #B is the reference location.

By way of example but not limitation, for example, the identifier #γ may be carried in a resource reservation (Resource reservation) field (or, may be referred to as "domain") in the SCI. In this case, the value of the identifier #γ may include but is not limited to one of "1101", "1110" or "1111".

For another example, the identifier #γ may be carried in a modulation and coding scheme (Modulation and coding scheme, MCS) field in the SCI. It should be noted that because the identifier #γ occupies the MCS field, in this case, the value of the MCS used to transmit data may be a default value specified by the communications system or the communications protocol.

It should be understood that the foregoing understood manner of sending the identifier #γ is only described as an example. This is not particularly limited in this application. For example, the identifier #γ may also be separately sent as independent information.

It should be noted that the identifier #γ may be the same as the identifier #α, or may be different from the identifier #α. This is not particularly limited in the present invention.

Processing Method B

Specifically, the communications system or the communications protocol may specify that the sending device sends a synchronization signal only on a carrier to which the time-frequency resource that is used as the reference location belongs.

In this case, the device #A can send the synchronization signal by using the carrier #B, so that when detecting the synchronization signal in the carrier #B, the device #B can determine that a location of the time-frequency resource used by the device #A in the carrier #B is the reference location.

Processing Method C

Specifically, the communications system or the communication protocols can specify a specific sequence #θ (that is, an example of a first sequence). The identifier #θ may have the following function: When a device receives a synchronization signal (or, a reference signal) corresponding to the identifier #θ, the device can determine a location of the time-frequency resource occupied by the sending device in a carrier that carries the synchronization signal corresponding to the identifier #θ as the reference location.

By way of example but not limitation, for example, the synchronization signal may be a PSSS. In this case, the sequence #θ may be a sequence used to generate the PSSS.

For another example, the synchronization signal may be an SSSS. In this case, the sequence #θ may be a sequence used to generate the SSSS.

It should be noted that the identifier #γ may be the same as the identifier #β and may be different from the identifier #β. This is not particularly limited in the present invention.

In this way, in the foregoing manner, a process in which the device #A and the device #B transmit the information #D can be implemented.

In this way, the device #B can accurately learn of, based on the information #A and the information #D, the carrier used when the device #A sends the data; and a location of the time-frequency resource occupied by the device #A on the carrier used by the device #A (that is, a reserved resource for the device #A).

In this way, in S220, the device #A can send the data on the reserved resource on the N carriers.

The device #B can receive the data on the time-frequency resource determined based on the information #A and the information #D.

In addition, in this embodiment of the present invention, the device #A can further send information #E, where the information #E may be used to indicate whether the device #A performs cross-carrier scheduling. In other words, the information #E may be used to indicate whether indication information (for example, the information #A) used to indicate a plurality of carriers used when the device #A sends the data is carried in a carrier (for example, the carrier #A) in the M carriers.

For example, the information #E can occupy, for example, a bit in the SCI. For example, when the bit is 1, it may indicate that the device #A performs cross-carrier scheduling. In this case, a process described in the method 200 may be performed. When the bit is 0, it may indicate that the device #A does not perform cross-carrier scheduling. In this case, transmission can be performed based on the prior art.

Moreover, as shown in the foregoing, because some or all information in the information #A to the information #E may be carried in the SCI, a form of the SCI in this application may be different from a form of the SCI in the prior art. In this case, the device #A can send information #F, where the information #F may be used to indicate whether the form of the SCI is different from that in the prior art; or the information #F may be used to indicate whether some or all information in the information #A to the information #E is carried in the SCI.

For example, the information #E can occupy, for example, a bit in the SCI. For example, when the bit is 1, it may indicate that the SCI uses the format of this application. In this case, the SCI may be interpreted based on related descriptions in the method 200. When the bit is 0, it may indicate that the SCI does not change. In this case, the SCI may be interpreted based on the prior art.

For example, in an implementation, the device #A indicates, by using a bit in the SCI, whether the device #A performs cross-carrier scheduling. If the device #A performs cross-carrier scheduling, the device #A carries the information #A and the information #D in the MAC CE to indicate information of the carrier used when the device #A transmits the data and information of the time-frequency resource on the corresponding carrier.

Figure 6:
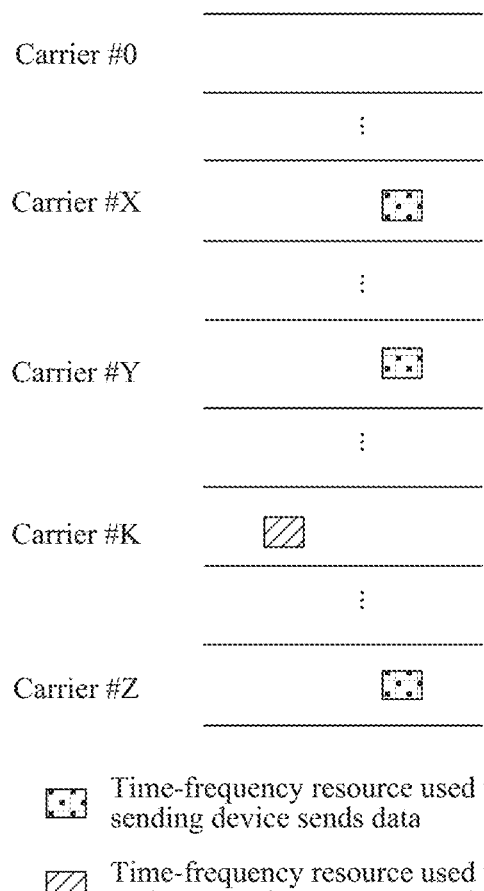
FIG. 6 is a schematic diagram of cross-carrier scheduling in this application.

As shown in FIG. 6, when a sending device occupies a time-frequency resource #x in a carrier #X, a time-frequency resource #y in a carrier #Y and a time-frequency resource #z in a carrier #Z to send data, cross-carrier scheduling information (that is, an example of first information) may be sent on a carrier #K, where the cross-carrier scheduling information may be used to indicate that the sending device uses the carrier #X, the carrier #Y and the carrier #Z to send the data.

Based on the data transmission method in this application, a sending device sends first information on one carrier, where the first information is used to indicate a plurality of carriers used when the sending device sends data. In this way, a receiving device does not need to perform blind detection on each carrier, and can determine, based on the first information whether each carrier is used by the sending device, thereby improving communication efficiency, and reducing processing load on the receiving device.

In the foregoing embodiment, when a device #A is a network device, control information SCI may be replaced with downlink control information (Downlink Control Information, DCI) and transmitted on a physical downlink control channel (Physical Downlink Control Channel, PDCCH), and Data (including a MAC CE) transmitted on a PSSCH may be changed to be transmitted on a physical downlink shared channel (Physical Downlink Shared Channel, PDSCH).

It should be noted that after determining that the device #A sends the data on N carriers, the device #B can receive the data on some of the N carriers, or can receive the data on all of the N carriers. This is not particularly limited in the present invention.

Figure 7:
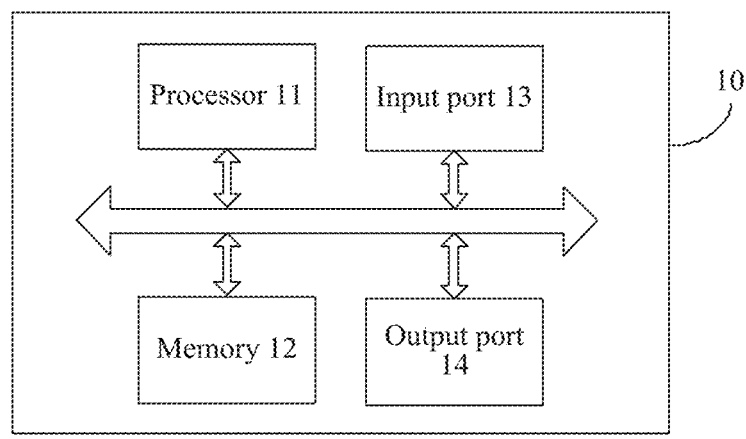
FIG. 7 is a schematic block diagram of an example of a data transmission apparatus in this application.

Based on the foregoing method, FIG. 7 is a schematic diagram of a data transmission apparatus 10 according to an embodiment of this application. As shown in FIG. 7, the communications apparatus 10 may be a sending device (for example, the device #A), or may be a chip or a circuit, for example, may be a chip or a circuit disposed in the sending device.

The communications apparatus 10 may include a processor 11 (that is, an example of a processing unit) and a memory 12. The memory 12 is configured to store an instruction, and the processor 11 is configured to execute the instruction stored in the memory 12, to enable the apparatus 20 to implement the step that is executed by the sending device (for example, the device #A) and that is in the corresponding method shown in FIG. 3.

Further, the communications apparatus 10 may further include an input port 13 (that is, an example of a communications unit) and an output port 14 (that is, another example of the communications unit). Further, the processor 11, the memory 12, the input port 13 and the output port 14 may communicate with each other and transfer a control and/or data signal between each other by using an internal connection path. The memory 12 is configured to store a computer program, and the processor 11 may be configured to: invoke the computer program from the memory 12 and run the computer program, to control the input port 13 to receive the signal; and control the output port 14 to send the signal, to complete the step of the terminal device in the method. The memory 12 may be integrated in the processor 11, or may be separately disposed with the processor 11.

Optionally, if the communications apparatus 10 is a sending device, the input port 13 is a receiver, and the output port 14 is a transmitter. The receiver and the transmitter may be the same or different physical entities. When being the same physical entity, the receiver and the transmitter may be collectively referred to as a transceiver.

Optionally, if the communications apparatus 10 is a chip or a circuit, the input port 13 is an input interface, and the output port 14 is an output interface.

In an implementation, functions of the input port 13 and the output port 14 may be implemented by using a transceiver circuit or a dedicated transceiver chip. The processor 11 may be implemented by using a dedicated processing chip, a processing circuit, a processor or a general-purpose chip.

In another implementation, the terminal device provided in the embodiments of this application may be implemented in a manner of using a general-purpose computer. In other words, program code implementing functions of the processor 11, the input port 13 and the output port 14 is stored in the memory 12. A general-purpose processor implements functions of the processor 11, the input port 13 and the output port 14 by executing the code in the memory 12.

The modules or units in the communications apparatus 10 may be configured to execute actions or processing processes executed by the device #A in the foregoing method. Herein, to avoid repeated descriptions, detailed descriptions thereof are omitted.

For concepts, explanations, detailed descriptions and other steps that are related to the technical solution provided in the embodiments of this application and that are related to the apparatus 10, refer to the descriptions about content in the foregoing methods or other embodiments. Details are not described herein again.

Figure 8:
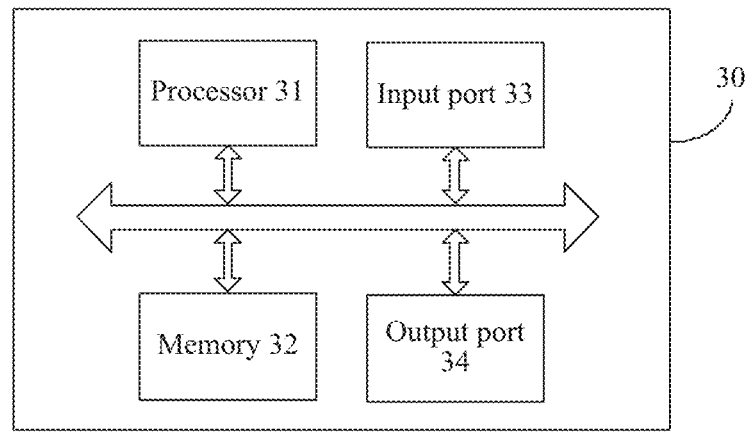
FIG. 8 is a schematic block diagram of another example of a data transmission apparatus in this application.

Based on the foregoing method, FIG. 8 is a schematic diagram of a communications apparatus 30 according to an embodiment of this application. As shown in FIG. 8, the apparatus 30 may be a receiving device (for example, the device #B), or may be a chip or a circuit, for example, may be a chip or a circuit disposed in the receiving device.

The apparatus 30 may include a processor 31 (that is, an example of a processing unit) and a memory 32. The memory 32 is configured to store an instruction, and the processor 31 is configured to execute the instruction stored in the memory 32, to enable the apparatus 30 to implement the step performed by the receiving device (for example, the device #B) in the foregoing method.

Further, the apparatus 30 may further include an input port 33 (that is, an example of a communications unit) and an output port 33 (that is, another example of a processing unit). Furthermore, the processor 31, the memory 32, the input port 33 and the output port 34 may communicate with each other and transfer a control and/or data signal between each other by using an internal connection path. The memory 32 is configured to store a computer program, and the processor 31 may be configured to: invoke the computer program from the memory 32 and run the computer program.

In an implementation, functions of the input port 33 and the output port 34 may be implemented by using a transceiver circuit or a dedicated transceiver chip. The processor 31 may be implemented by using a dedicated processing chip, a processing circuit, a processor or a general-purpose chip.

In another implementation, the network device provided in the embodiments of this application may be implemented by using a general-purpose computer. In other words, program code implementing functions of the processor 31, the input port 33 and the output port 34 is stored in the memory. A general-purpose processor implements functions of the processor 31, the input port 33 and the output port 34 by executing code in the memory.

The modules or units in the communications apparatus 30 may be configured to execute actions or processing processes executed by the receiving device in the foregoing method. Herein, to avoid repeated descriptions, detailed descriptions thereof are omitted.

For concepts, explanations, detailed descriptions and other steps that are related to the technical solution provided in the embodiments of this application and that are related to the apparatus 30, refer to the descriptions about content in the foregoing methods or other embodiments. Details are not described herein again.

Figure 9:
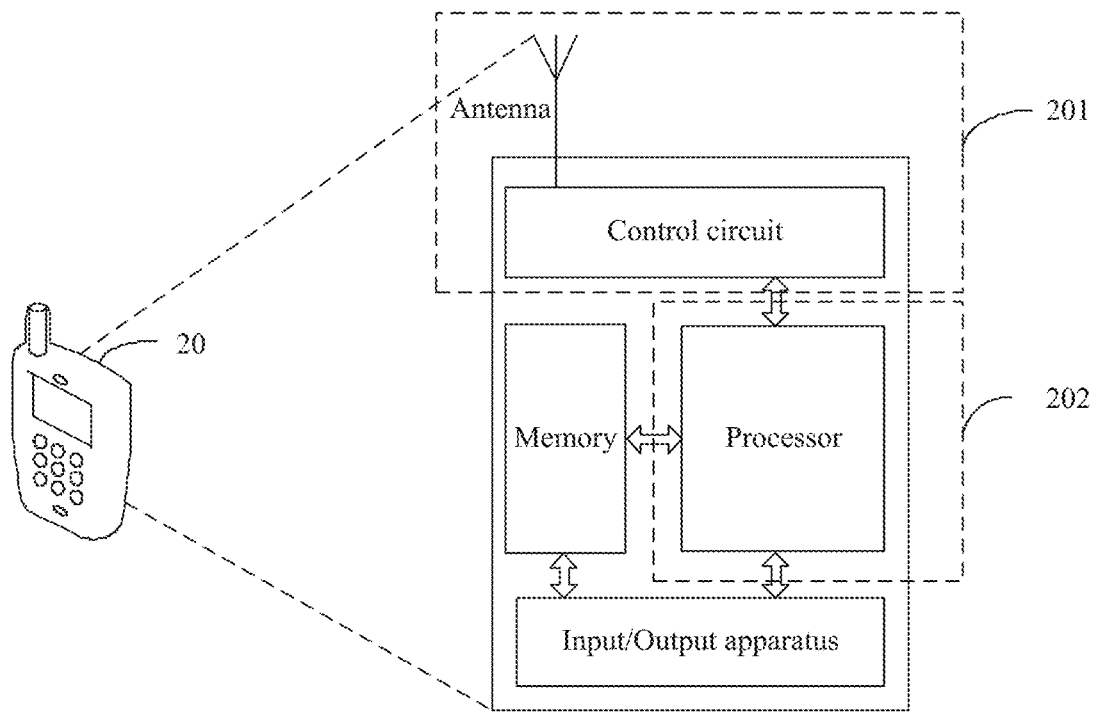
FIG. 9 is a schematic block diagram of an example of a terminal device in this application.

FIG. 9 is a schematic structural diagram of a terminal device 20 according to this application. For ease of description, FIG. 9 shows only main components of the terminal device. As shown in FIG. 9, the terminal device 20 includes: a processor, a memory, a control circuit, an antenna, and an input/output apparatus.

The processor is mainly configured to: process a communications protocol and communication data, control the entire terminal device, execute a software program, and process data of the software program, for example, is configured to support the terminal device in executing an action described in the foregoing method embodiments. The memory is mainly configured to store the software program and data, for example, the codebook described in the foregoing embodiments. The control circuit is mainly configured to: convert a baseband signal and a radio frequency signal, and process the radio frequency signal. The control circuit together with the antenna may also be referred to as a transceiver, mainly configured to transceive a radio frequency signal of an electromagnetic wave form. The input/output apparatus, such as a touchscreen, a display, or a keyboard, is mainly configured to: receive data entered by a user and output data to the user.

After the terminal device is turned on, the processor may read the software program stored in the storage unit, explain and execute an instruction of the software program, and process the data of the software program. When data needs to be wirelessly sent, after performing baseband processing on the to-be-sent data, the processor outputs a baseband signal to a radio frequency circuit. After performing radio frequency processing on the baseband signal, the radio frequency circuit sends the radio frequency signal in a form of electromagnetic wave by using the antenna. When data is sent to the terminal device, the radio frequency circuit receives the radio frequency signal by using the antenna, converts the radio frequency signal into a baseband signal, and outputs the baseband signal to the processor. The processor converts the baseband signal into data, and processes the data.

A person skilled in the art may understand that for ease of description, FIG. 9 shows only one memory and one processor. In an actual terminal device, there may be a plurality of processors and a plurality of memories. The memory may also be referred to as a storage medium, a storage device, or the like. This is not limited in the embodiments of this application.

In an optional implementation, the processor may include a baseband processor and a central processing unit. The baseband processor is mainly configured to process a communications protocol and communication data. The central processing unit is mainly configured to: control the entire terminal device, execute a software program, and process data of the software program. The processor in FIG. 9 integrates functions of the baseband processor and the central processing unit. A person skilled in the art may understand that the baseband processor and the central processing unit may be respectively independent processors, and are interconnected by using technologies such as a bus. A person skilled in the art may understand that the terminal device may include a plurality of baseband processors, to adapt to different network standards. The terminal device may include a plurality of central processing units, to enhance a processing capability of the terminal device. Components of the terminal device may be connected to each other by using various buses. The baseband processor may also be represented as a baseband processing circuit or a baseband processing chip. The central processing unit may also be represented as a central processing circuit or a central processing chip. A function of processing the communications protocol and the communication data may be set in the processor, or may be stored in the storage unit in a software program form. The processor executes the software program, to implement a baseband processing function.

For example, in the embodiments of this application, the antenna having a transceiving function, and the control circuit may be viewed as a transceiver unit 201 of the terminal device 20. The processor having a processing function may be viewed as a processing unit 202 of the terminal device 20. As shown in FIG. 9, the terminal device 20 includes the transceiver unit 201 and the processing unit 202. The transceiver unit may also be referred to as a transceiver, a transceiver machine, a transceiver apparatus, and the like. Optionally, a component for implementing a receiving function in the transceiver unit 201 may be considered as a receiving unit, and a component for implementing a sending function in the transceiver unit 201 may be considered as a sending unit, that is, the transceiver unit 201 includes the receiving unit and the sending unit. For example, the receiving unit may also be referred to as a receiver machine, a receiver, a receiver circuit, and the like. The sending unit may also be referred to as a transmitter machine, a transmitter, a transmitter circuit, and the like.

The terminal device shown in FIG. 9 can execute each action executed by the sending device or the receiving device in the method 200. To avoid repeated description, detailed descriptions are not described herein again.

Figure 10:
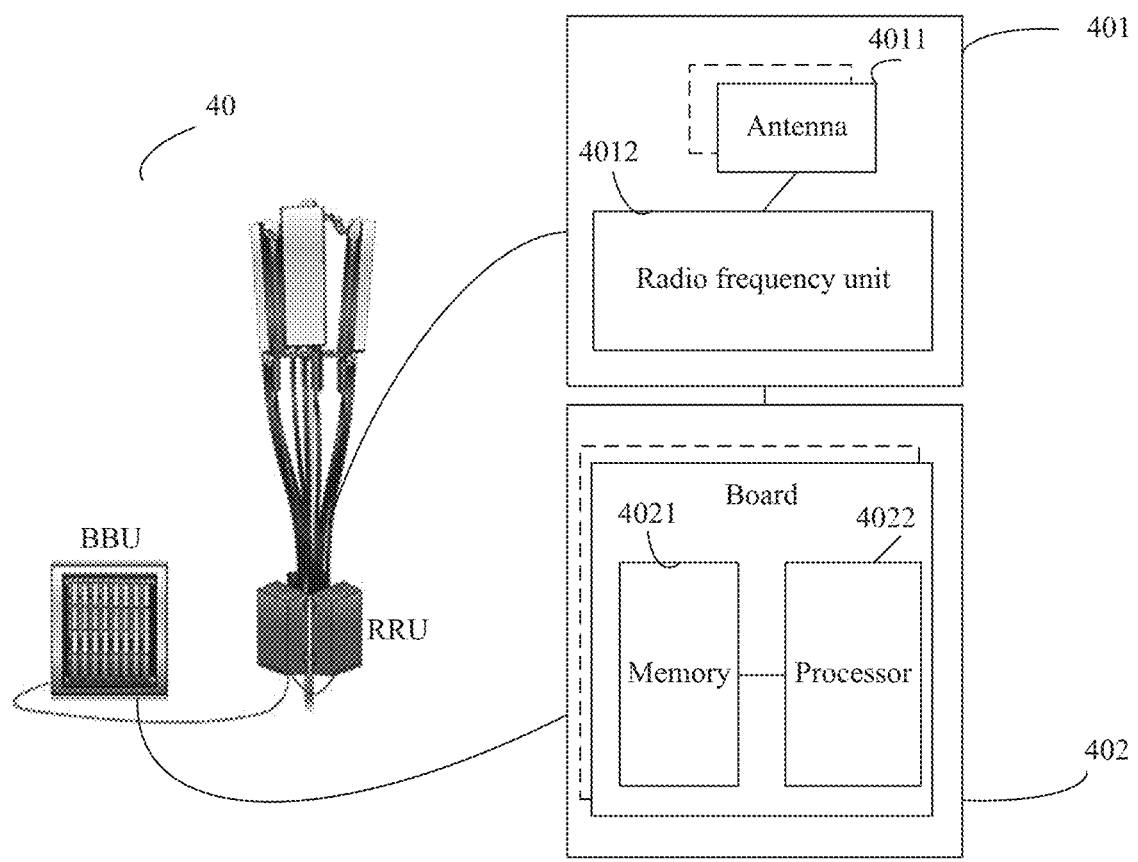
FIG. 10 is a schematic block diagram of an example of a network device in this application.

FIG. 10 is a schematic structural diagram of a network device 40 according to an embodiment of this application. The network device 40 includes one or more radio frequency units, for example, a remote radio unit (remote radio unit, RRU) 401 and one or more baseband units (baseband unit, BBU) (also referred to as a digital unit, digital unit, DU)) 402. The RRU 401 may be referred to as a transceiver unit, a transceiver machine, a transceiver circuit, a transceiver, or the like, and may include at least one antenna 4011 and a radio frequency unit 4012. The RRU 401 part is mainly configured to: transceive a radio frequency signal, and convert the radio frequency signal and a baseband signal, for example, is configured to send the signaling information described in the foregoing embodiment to the terminal device. The BBU 402 part is mainly configured to: perform baseband processing, control the base station, and the like. The RRU 401 and the BBU 402 may be physically disposed together, or may be physically separately disposed, that is, a distributed base station.

The BBU 402 is a control center of the base station, and may also be referred to as a processing unit, mainly configured to complete a baseband processing function, for example, channel coding, multiplexing, modulation, and spectrum spreading. For example, the BBU (the processing unit) 402 may be configured to control a base station 40 to perform the operation procedure of the network device in the foregoing method embodiment.

In an example, the BBU 402 may include one or more boards. A plurality of boards may jointly support a radio access network (for example, an LTE system, or a 5G system) of a single access standard, or may respectively support radio access networks of different access standards. The BBU 402 further includes a memory 4021 and a processor 4021. The memory 4021 is configured to store a necessary instruction and necessary data. For example, the memory 4021 stores the codebook in the foregoing embodiment. The processor 4022 is configured to control a base station to execute necessary actions, for example, configured to control the base station to perform the operation procedure of the network device in the foregoing method embodiment. The memory 4021 and the processor 4022 may serve one or more boards. In other words, the memory and the processor may be disposed individually on each board. Alternatively, a plurality of boards may share the same memory and the same processor. In addition, a necessary circuit is disposed on each board.

In a possible implementation, with development of system-on-chip (System-on-chip, SoC) technologies, some or all of functions of the 402 part and the 401 part may be implemented by using the SoC technology such as a base station function chip. The base station function chip is integrated with devices such as a processor, a memory, and an antenna interface, a program of a base station-related function is stored in the memory, and the program is executed by the processor to implement the base station-related function. Optionally, the base station function chip can further read a memory outside the chip to implement the base station-related function.

It should be understood that the structure of the network device shown in FIG. 10 is only a possible form, and should not be construed as any limitation on the embodiments of this application. This application does not exclude a possibility of other forms of base station structures that may appear in the future.

The network device shown in FIG. 10 can execute each action executed by the sending device or the receiving device in the method 200. To avoid repeated description, detailed descriptions are not described herein again.

Based on the method provided in the embodiments of this application, an embodiment of this application further provides a communications system, including the network device described above and one or more terminal devices.

It should be understood that, the processor in the embodiments of this application may be a central processing unit (central processing unit, CPU), or may be another general purpose processor, a digital signal processor (digital signal processor, DSP), an application specific integrated circuit (application specific integrated circuit, ASIC), a field programmable gate array (field programmable gate array, FPGA), or another programmable logical device, discrete gate or transistor logical device, discrete hardware component, or the like. The general purpose processor may be a microprocessor, or the processor may be any conventional processor or the like.

It may be understood that the memory in the embodiments of this application may be a volatile memory or a nonvolatile memory, or may include a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. Through example but not limitative description, many forms of random access memory (random access memory, RAM) RAMs may be used, for example, a static random access memory (static RAM, SRAM), a dynamic random access memory (dynamic random access memory, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus dynamic random access memory (direct rambus RAM, DR RAM).

All or some of the foregoing embodiments may be implemented by means of software, hardware, firmware, or any combination thereof. When software is used to implement the embodiments, the foregoing embodiments may be implemented completely or partially in a form of a computer program product. The computer program product includes one or more computer instructions or computer programs. When the program instructions or the computer programs are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

The term "and/or" in this specification describes only an association relationship between associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application. It may be clearly understood by a person skilled in the art that, for the purpose of convenient and brief description, for a detailed working process of the foregoing system, apparatus, and unit, refer to a corresponding process in the foregoing method embodiments, and details are not described herein again. In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments. In addition, functional units in the embodiments of this application may be integrated into one processing unit, or each of the units may exist alone physically, or two or more units are integrated into one unit. When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data transmission method implemented by a first device, wherein the data transmission method comprises:
    sending first information using a first carrier, wherein the first carrier comprises:
        a preconfigured carrier;
        a carrier configured by a network device;
        a primary component carrier in M carriers;
        a carrier which carries a first identifier from the first device, wherein the first identifier is preconfigured or configured by a network device, and wherein the first identifier indicates that the carrier that carries the first identifier carries the first information; or
        a carrier which carries a synchronization signal, wherein a carrier other than the first carrier in the M carriers does not carry the synchronization signal;
    wherein the first information indicates that the first device uses N carriers in the M carriers to send data, and indicates whether each carrier other than the first carrier in the M carriers comprises a first time-frequency resource, wherein the first time-frequency resource is used when the first device sends the data, wherein the first information comprises M-1 bits, wherein the M-1 bits are in a one-to-one correspondence to M-1 carriers, wherein each bit of the M-1 bits indicates whether a corresponding carrier comprises the first time-frequency resource, wherein the M-1 carriers are carriers other than the first carrier in the M carriers, wherein N is an integer greater than or equal to two, and wherein N is less than or equal to M; and
    sending the data using the N carriers.

2. The data transmission method of claim 1, wherein a location of the first time-frequency resource on the N carriers is preconfigured or configured by the network device.

3. The data transmission method of claim 1, further comprising sending second information using the first carrier, wherein the second information indicates a location of the first time-frequency resource on the first carrier and wherein a location of the first time-frequency resource on the N carriers is the same as the location of the first time-frequency resource on the first carrier.

4. The data transmission method of claim 3, wherein the second information further indicates an offset of the location of the first time-frequency resource on the first carrier that is relative to a reference location.

5. The data transmission method of claim 1, further comprising sending N pieces of third information, wherein the N carriers are in a one-to-one correspondence to the N pieces of third information, and wherein each of the N pieces of third information indicates a location of the first time-frequency resource on a corresponding carrier.

6. The data transmission method of claim 5, wherein each of the N pieces of third information further indicates an offset of the location of the first time-frequency resource on the corresponding carrier that is relative to a reference location.

7. The data transmission method of claim 6, wherein the reference location is:
    a preconfigured location;
    a location configured by the network device; or
    a location of the first time-frequency resource on a second carrier in the N carriers, and
    wherein the second carrier is:
        a preconfigured carrier;
        a carrier configured by the network device;
        a primary component carrier in the N carriers;
        a carrier which carries a second identifier, wherein the second identifier indicates that a location of the first time-frequency resource in the carrier that carries the second identifier is the reference location; or
        a carrier that carries a synchronization signal, wherein a carrier other than the second carrier in the N carriers does not carry the synchronization signal, and wherein a location of the first time-frequency resource on the carrier that carries the synchronization signal is the reference location.

8. The data transmission method of claim 1 further comprising:
    sending N pieces of third information using the first carrier; or
    sending the N pieces of third information using the N carriers, wherein each of the N pieces of third information is carried in a corresponding carrier of the N carriers.

9. The data transmission method of claim 8, wherein the N pieces of third information are carried in sidelink control information (SCI) or in a media access control (MAC) control element (CE).

10. A data transmission method implemented by a second device, wherein the data transmission method comprises:
    receiving first information from a first device using a first carrier, wherein the first carrier comprises:
        a preconfigured carrier;
        a carrier configured by a network device;
        a primary component carrier in the M carriers;
        a carrier which carries a first identifier received from the first device, wherein the first identifier is preconfigured or configured by the network device, and wherein the first identifier indicates that the carrier that carries the first identifier carries the first information; or
        a carrier which carries a synchronization signal, wherein a carrier other than the first carrier in the M carriers does not carry the synchronization signal;
    wherein the first information indicates that the first device uses N carriers in M carriers to send data, and indicates whether each carrier other than the first carrier in the M carriers comprises a first time-frequency resource, wherein the first time-frequency resource is used when the first device sends the data, wherein the first information comprises M-1 bits, wherein the M-1 bits are in a one-to-one correspondence to M-1 carriers, wherein each of the M-1 bits indicates whether a corresponding carrier comprises the first time-frequency resource, wherein the M-1 carriers are carriers other than the first carrier in the M carriers, wherein N is an integer greater than or equal to two, and wherein N is less than or equal to M; and receiving the data from the first device using the N carriers.

11. The data transmission method of claim 10, wherein a location of the first time-frequency resource on the N carriers is preconfigured.

12. A communications device comprising:
a transceiver configured to receive or send data or information; and
a processor coupled to the transceiver and configured to:
control the transceiver to send first information using a first carrier, wherein the first carrier comprises:
a preconfigured carrier;
a carrier configured by a network device;
a primary component carrier in the M carriers;
a carrier which carries a first identifier from the first device, wherein the first identifier is preconfigured or configured by the network device, and wherein the first identifier indicates that the carrier that carries the first identifier carries the first information; or
a carrier which carries a synchronization signal, wherein a carrier other than the first carrier in the M carriers does not carry the synchronization signal;
wherein the first information indicates that the communications device uses N carriers in M carriers to send the data, and whether each carrier other than the first carrier in the M carriers comprises a first time-frequency resource, wherein the first time-frequency resource is used when the communications device sends the data, wherein the first information comprises M-1 bits, wherein the M-1 bits are in a one-to-one correspondence to M-1 carriers, wherein each of the M-1 bits indicates whether a corresponding carrier comprises the first time-frequency resource, wherein the M-1 carriers are carriers other than the first carrier in the M carriers, wherein N is an integer greater than or equal to 2, and wherein N is less than or equal to M; and
control the transceiver to send the data using the N carriers.

13. The communications device of claim 12, wherein a location of the first time-frequency resource on the N carriers is preconfigured or configured by a network device.

14. The communications device of claim 12, wherein the processor is further configured to control the transceiver to send second information using the first carrier, wherein the second information indicates a location of the first time-frequency resource on the first carrier, and wherein a location of the first time-frequency resource on the N carriers is the same as the location of the first time-frequency resource on the first carrier.

15. The communications device of claim 12, wherein the processor is further configured to control the transceiver to send N pieces of third information, wherein the N carriers are in a one-to-one correspondence to the N pieces of third indication information, and wherein each of the N pieces of third information indicates a location of the first time-frequency resource on a corresponding carrier.

16. The communications device of claim 15, wherein each of the N pieces of third information further indicates an offset of the location of the first time-frequency resource on the corresponding carrier that is relative to a reference location.

17. The data transmission method of claim 1, wherein a synchronization signal carried in the first carrier corresponds to a first sequence, wherein the first sequence is a preconfigured sequence or a sequence configured by a network device, and wherein the first sequence indicates that a carrier that carries the synchronization signal corresponding to the first sequence carries the first information.

18. The data transmission method of claim 10, further comprising sending second information using the first carrier, wherein the second information indicates a location of the first time-frequency resource on the first carrier and wherein a location of the first time-frequency resource on the N carriers is the same as the location of the first time-frequency resource on the first carrier.

19. The data transmission method of claim 18, wherein the second information further indicates an offset of the location of the first time-frequency resource on the first carrier that is relative to a reference location.

20. The data transmission method of claim 10, wherein a synchronization signal carried in the first carrier corresponds to a first sequence, wherein the first sequence is a preconfigured sequence or a sequence configured by a network device, and wherein the first sequence indicates that a carrier that carries the synchronization signal corresponding to the first sequence carries the first information.

* * * * *